United States Patent
Campbell

(10) Patent No.: US 7,890,957 B2
(45) Date of Patent: Feb. 15, 2011

(54) REMOTE MANAGEMENT OF AN ELECTRONIC PRESENCE

(75) Inventor: Tom Campbell, Bellevue, WA (US)

(73) Assignee: EasyOnMe, Inc., Bellevue, WA (US)

(*) Notice: Subject to any disclaimer, the term of this patent is extended or adjusted under 35 U.S.C. 154(b) by 210 days.

(21) Appl. No.: 11/853,002

(22) Filed: Sep. 10, 2007

(65) Prior Publication Data

US 2008/0066080 A1 Mar. 13, 2008

Related U.S. Application Data

(60) Provisional application No. 60/825,111, filed on Sep. 8, 2006.

(51) Int. Cl.
*G06F 3/00* (2006.01)
*G06F 17/00* (2006.01)
(52) U.S. Cl. ............ 719/313; 715/752; 715/200
(58) Field of Classification Search .......... 719/314, 719/315, 313; 710/24; 709/229; 715/200, 715/752
See application file for complete search history.

(56) References Cited

U.S. PATENT DOCUMENTS

| 4,435,753 | A | * | 3/1984 | Rizzi .......................... 717/153 |
| 4,868,763 | A | * | 9/1989 | Masui et al. ................... 706/10 |
| 5,530,864 | A | | 6/1996 | Matheny et al. |
| 5,945,989 | A | * | 8/1999 | Freishtat et al. .............. 715/760 |
| 6,021,462 | A | * | 2/2000 | Minow et al. ................. 711/114 |
| 6,560,604 | B1 | | 5/2003 | Fascenda et al. |
| 7,039,875 | B2 | | 5/2006 | Khalfay et al. |
| 7,174,556 | B2 | * | 2/2007 | Lambert ...................... 719/315 |
| 7,283,831 | B2 | | 10/2007 | Caldini et al. |
| 7,536,686 | B2 | | 5/2009 | Tan et al. |
| 2002/0184043 | A1 | * | 12/2002 | Lavorgna et al. ............... 705/1 |
| 2004/0210452 | A1 | | 10/2004 | Aboujaoude et al. |
| 2006/0053124 | A1 | * | 3/2006 | Nishio et al. .................. 707/100 |
| 2008/0065974 | A1 | | 3/2008 | Campbell |

OTHER PUBLICATIONS

Bonnie A. Nardi, Interaction and Outeracton: Instant Messaging in Action, Dec. 2000.*
"U.S. Appl. No. 11/853,007, Non-Final Office Action mailed Jul. 21, 2010", , 16 pgs.

* cited by examiner

*Primary Examiner*—Lechi Truong
(74) *Attorney, Agent, or Firm*—Strategic Patents, P.C.

(57) ABSTRACT

A platform provides an intuitive and integrated management tool for disparate communications channels. Media such as web sites, web logs, electronic mail, instant messaging, and short messaging services may be combined and controlled through a single access point. The user interface for the access point may itself be deployed for use with a cellular phone, web client, or the like. While graphical user interfaces are one useful embodiment, a command-oriented interface may similarly be operated telephonically, or using electronic mail, instant messaging, SMS, or any other suitable technique.

15 Claims, 11 Drawing Sheets

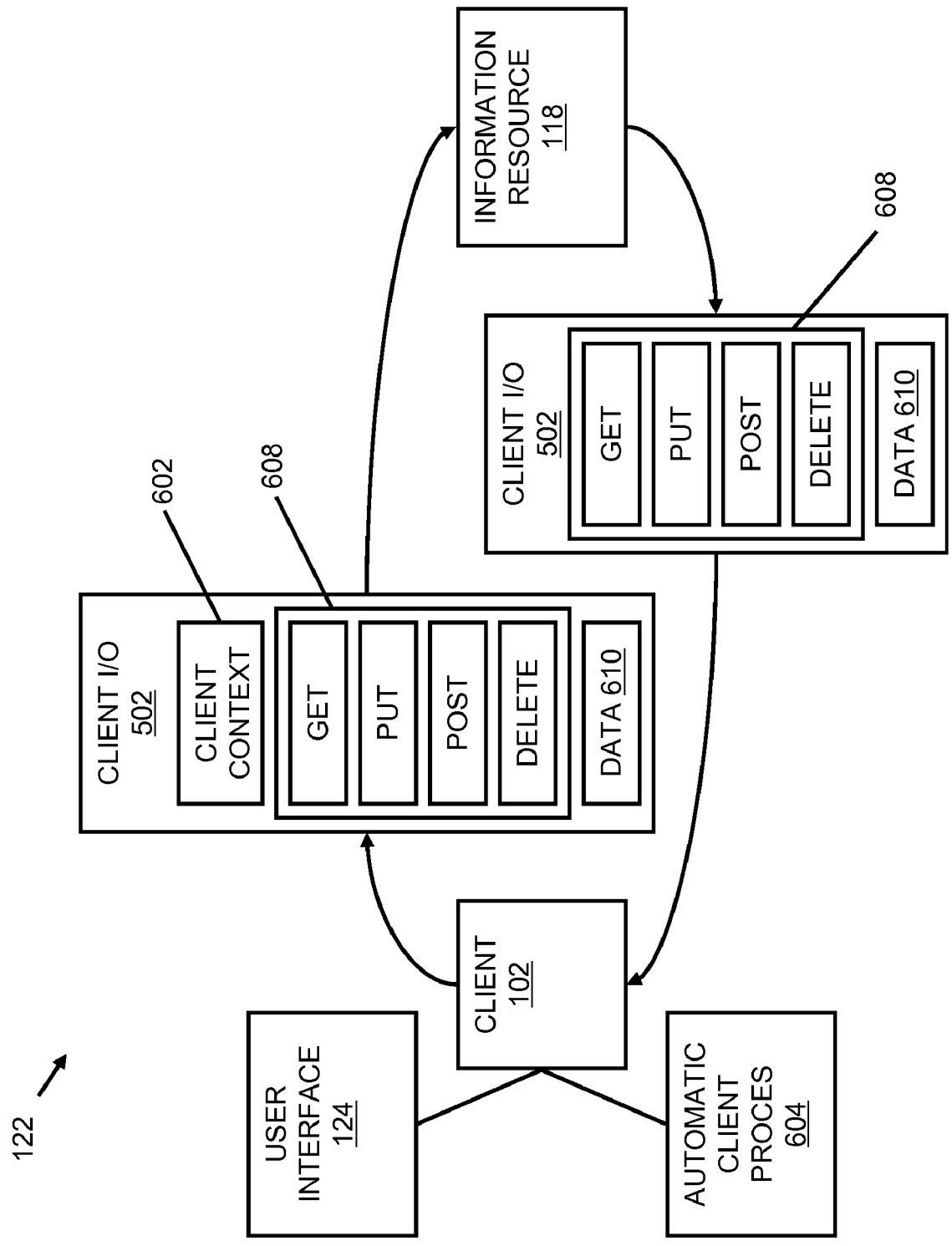

REMOTE MANAGEMENT OF AN ELECTRONIC PRESENCE

RELATED APPLICATIONS

This application claims the benefit of U.S. Prov. App. No. 60/825,111 filed on Sep. 8, 2006, the entire content of which is hereby incorporated by reference.

BACKGROUND

Over the past several decades, numerous communications technologies have become commonplace. This ranges from the Internet, which has provided personalized web sites, weblogs, and the like, to electronic mail, which has migrated from conventional Internet clients such as personal computers over to cellular phones, personal digital assistants, and dedicated wireless electronic mail clients. Other technologies such as facsimiles, voice mail, Short Messaging Service ("SMS") and the like are also commonplace.

In general, each new medium provides a separate communication channel with its own underlying technology. Tools have emerged to assist non-technical users with each such technology. For example, electronic mail clients have become increasingly sophisticated in their ability to provide services on top of basic messaging, such as organization into folders, archiving, scheduling, forwarding, and filtering. As another example, a number of client-based web design tools are available, and in some cases, a domain hosting service will provide online tools for creation of basic websites.

However, there is no integrated tool to assist consumers in managing multiple communications technologies. There remains a need for intuitive electronic presence management tools suitable for general use.

SUMMARY

A platform provides an intuitive and integrated management tool for disparate communications channels. Media such as web sites, web logs, electronic mail, instant messaging, and short messaging services may be combined and controlled through a single access point. The user interface for the access point may itself be deployed for use with a cellular phone, web client, or the like. While graphical user interfaces are one useful embodiment, a command-oriented interface may similarly be operated telephonically, or using electronic mail, instant messaging, SMS, or any other suitable technique.

A method disclosed herein includes receiving a command to update a web page of an electronic presence, the command embedded in a message selected from a group consisting of an electronic mail, an instant message, and a text message; parsing the message to identify the command; executing the command to update the web page; receiving a second command to update a web page of an electronic presence, the second command embedded in a second message from a different one of the group consisting of an electronic mail, an instant message, and a text message; parsing the second message to identify the second command; and executing the second command to update the web page.

The message may be a text message. The command may undo a most recent change. The command may identify a blog post by number. The command may identify a previous command by sequential number relative to the current command. The electronic presence may include a description of at least one of an interactive voice response system, an instant messaging service, an electronic mail service, and a streaming video service.

A computer program product disclosed herein embodied on a computer readable medium comprising computer executable code that, when executing on one or more computing devices performs the steps of: receiving a command to update a web page of an electronic presence, the command embedded in a message selected from a group consisting of an electronic mail, an instant message, and a text message; parsing the message to identify the command; executing the command to update the web page; receiving a second command to update a web page of an electronic presence, the second command embedded in a second message from a different one of the group consisting of an electronic mail, an instant message, and a text message; parsing the second message to identify the second command; and executing the second command to update the web page.

The command may undo a most recent change. The command may identify a blog post by number. The command may identify a previous command by sequential number relative to the current command. The electronic presence may include a description of at least one of an interactive voice response system, an instant messaging service, an electronic mail service, and a streaming video service.

A system disclosed herein includes an interface that receives a plurality of messages from two or more communication channels; a message queue that stores the plurality of messages; and a command processor that interprets one of the plurality of messages to determine a command for updating an electronic presence including a web site.

The two or more communication channels may include two or more of a text messaging system, an electronic mail system, a web site, a voice mail system, and an instant messaging system. The command processor may generate additional commands and may add the commands to the message queue. The command processor may generate a request for additional information to a sender of a message when the command processor is unable to interpret the message. The interface may include one or more of a telephone number, an electronic mail address, and an instant messaging address at which the interface receives messages. The command processor may interpret one of the plurality of messages according to a sender of one of the plurality of messages. The command processor may interpret one of the plurality of messages according to one or more access privileges of the sender. The system may further include a remotely accessible console for reviewing the message queue. The electronic presence may include a description of at least one of an interactive voice response system, an instant messaging service, an electronic mail service, and a streaming video service.

BRIEF DESCRIPTION OF THE FIGURES

The system and the following detailed description of certain embodiments thereof may be understood by reference to the following figures:

FIG. 6 depicts an interaction method between a client and an information resource.

DETAILED DESCRIPTION

Disclosed herein are techniques for non-technical people to create, maintain, and update an attractive electronic presence that may be shared with others. The electronic presence may consist of various general-purpose, web-based services, such as a website, a blog, a brochure, an image gallery, and so on. The electronic presence may additionally or alternatively consist of various special-purpose, web-based services, such as a restaurant menu, an interactive kennel rate sheet, a business leads group, and so on. The electronic presence may additionally or alternatively consists of various electronic information services that are not web-based, such as SMS-based services, voice-based services, and so on. Access control may be employed to restrict and/or delegate editing rights for a particular electronic presence.

Figure 1:
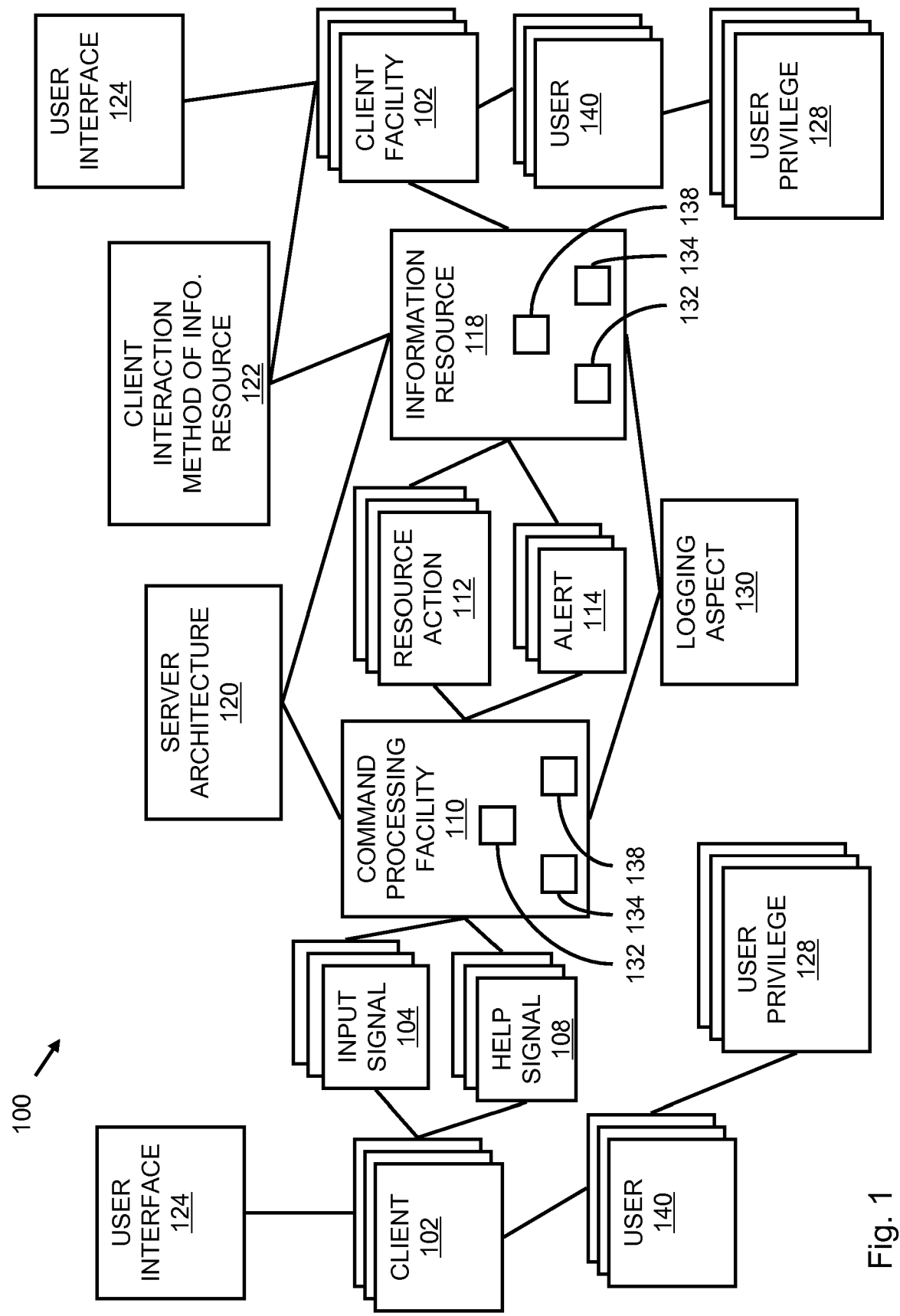
FIG. 1 depicts a system and method for non-technical people to create, maintain, and update an attractive electronic presence that may be shared with others.

Referring now to FIG. 1, a system 100 may include a number of clients 102, input signals 104, help signals 108, a command processor 110, resource actions 112, alerts 114, an information resource 118, a client interaction method 122 of the information resource 118, a server architecture 120, a user interface 124, user privileges 128, a logging aspect 130, a communication facility 132, a related technology 134, and a related feature 138. The clients 102 may be under the control of a number of users 140. A client 102 may be a multi-user facility such as a public computer terminal, or a single-user facility owned by or associated with a single, individual user 140. For example and without limitation, such a client 102 may include a cellular phone that is registered to a particular user 140. In any case, an object of the present system may be to provide services to the users 140. Some of these services may be provided generally to all users 140, while other services may be provided to particular subsets of all users 140.

The various services described herein may be provided by the command processor 110 and the information resource 118. The command processor 110 may receive input signals 104 from a client 102 that is associated with a user 140. The input signals 104 may be generated by the client 102 in response to a control input provided to the client 102 from the user 140. Various types of control input will be appreciated from the following disclosure and all such control inputs are within the scope of the present system. Perhaps depending upon a user privilege 128 associated with the user 140, the command processor 110 may process the input signal 104. In some cases, this processing may be associated with the command processor 110 returning a help signal 108 to the client 102. In some cases, this processing may be associated with the command processor 110 generating a resource action 112 in response to this processing. In any case, the command processor 100 converts input signals 104 into resource actions 112, either by generating resource actions 112 based thereupon, or by passing the input signals 104 through as resource actions where appropriate. The command processor 110 may also prompt the client 102 to transmit additional input signals 104, such as where the facility 110 cannot automatically perform requested action or where additional information is required. The command processor may transceiver the input signal 104, the help signal 108, the resource action 112, and/or the alert via a communication facility 132.

A method of interaction between a client 102, a command processor 110, and an information resource 118 may include the client 102 producing a signal that is received as an input signal 104 by the command processor; the command processor 110 processing the input signal; perhaps in response to or as a result of this processing, the command processor 110 producing any number of resource actions 112; receiving the resource actions 112 at the information resource 118; and, perhaps asynchronously with respect to the foregoing, the information resource 118 communicating directly with a client 102, wherein this communication may consist of encoded user 140 actions or interactions that do not require reduction or translation into resource actions 112 because the information resource 118 is able to process them directly. The client 102 that provides the input signal 104 to the command processor 110 ("the input client") may be the same client 102 that interacts directly with the information resource 118 and any number of clients 102 may be present.

The input client may accept user input associated with an input signal 104 via an input facility such as a microphone, keypad, graphical user interface, and so forth), which may be described herein or elsewhere. The input client may provide the input signal 104 to the command processor 110 by communicating the input signal 104 via an output facility of the input client. The command processor 110 may receive and process the input signal 104 and may optionally generate a client help signal, a resource action, or similar action; the command processor 110 may be described in greater detail herein or in any and all documents included herein by reference. The client help signal 108 may be returned to the input client to request clarification of an input signal. The command processor 110 may process an input signal 104 and deliver a resource action 112 to the information resource 118. Perhaps dependent on the resource action, the information resource 118 may generate and transmit a help signal 108 to the input client. The information resource 118 may communicate the help signal 108 to the original client 102 or a different client 102 than the input client 102.

The information resource 118 is a Web server and the client 102 is a Web client or browser, with interaction between the two conducted through a web session, an HTTP request/response, or the like. The content of this interaction is described in greater detail below. The client 102 may be a desktop computer, laptop computer, PDA, handheld computer, portable computer, cellular phone, smart phone, server, client, embedded computer or other computing device, and so forth. The client 102 may function as a client, server, peer, and so on.

Figure 3:
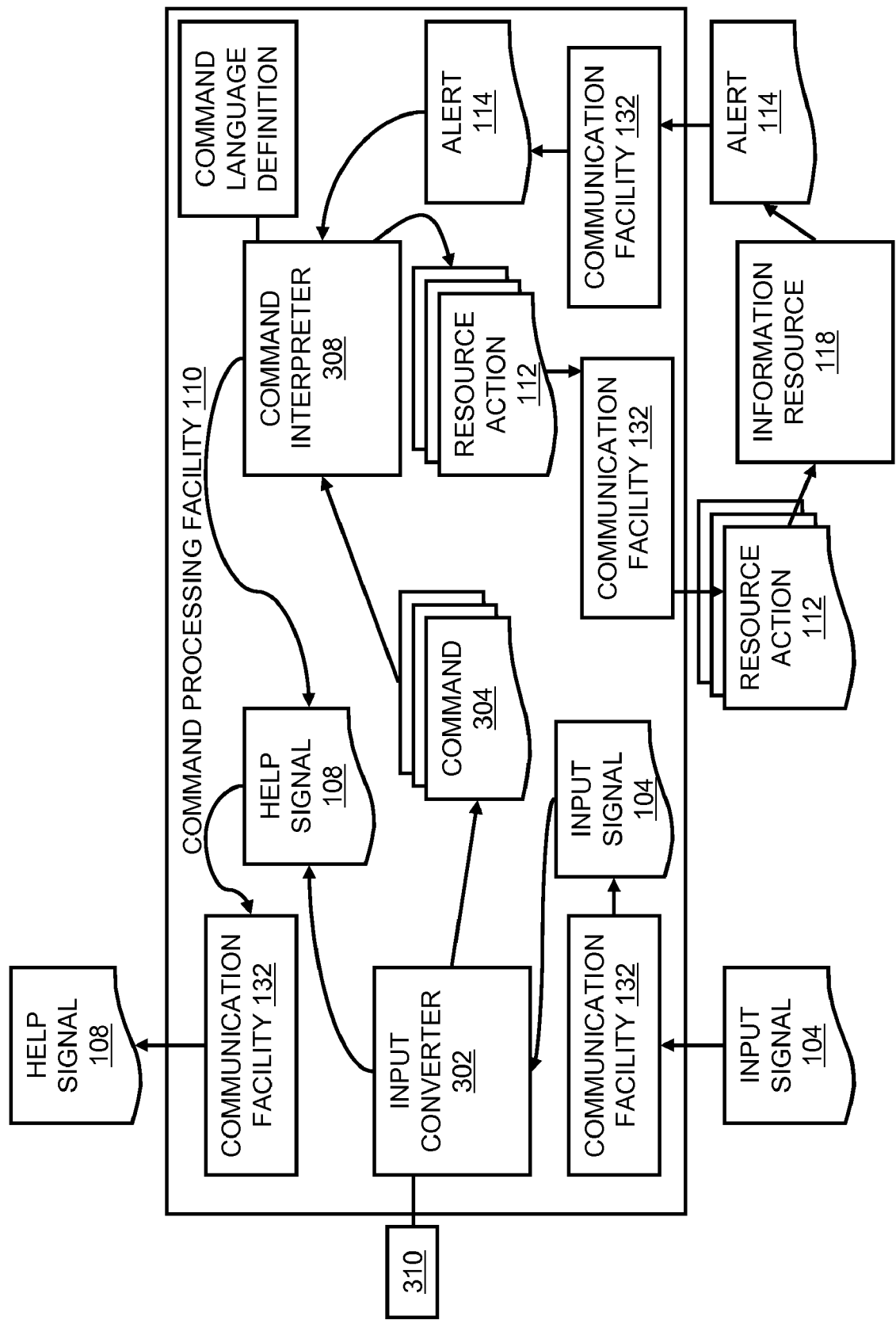
FIG. 3 depicts an expanded logical view of a command processor.

FIG. 3 shows a command processor in greater detail. In embodiments, once the command processor 110 receives an input signal 104, it may transmit the input signal 104 to an input converter 302 where the input signal 104 may be converted into a command 304. The input signal 104 may encode data in any form suitable for interpretation by the command processor including text, audio (such as and without limitation voice audio, DTMF audio, and so forth), a barcode scan, an image, a video, a selection, a data feed item, a sensor measurement, a clock tick, an alarm, a client context description, user 140 information (e.g. preferences), user privilege 128 information, textual information (e.g. email or SMS message), tabular information (e.g. cell phone UI table or web form), non-textual input, and the like. Commands 304 may be computer-interpretable commands. The command 304 may be in a command language definition (CLD) format or other command language format. The input signal 104 may already be in a command format where, for example, a client 102 can generate corresponding output.

The input signal 104 may include or be associated with a well-formed instruction, a malformed instruction, a longhand instruction, a shorthand instruction, an alternate instruction, or the like. The instructions may control an information resource 118 such as by adding, deleting, or modifying information that is stored in, maintained by, under the control of, or otherwise associated with the information resource 118. This information may in turn be associated with an electronic presence or a service thereof as generally described herein. The input converter 302 may condition the input signal 104 for further processing. For example, the input converter 302 may evaluate the presence and validity of commands 304 within the input signal 104. Where no command 304 is present, the command processor 110 may generate a help signal 108 for communication to the client 102 via the communication facility 132. The help signal 108 may be transmitted to the same client 102 that sent the input signal 104 or may be sent to another client 102.

In general, a help signal 108 prompts a user 140 for further input or information. This may include, for example: an indication that the input signal 104 was not understood (or was understood to be ambiguous), an interpretation of the received input signal 104, a request to verify the input signal 104, a help message with suggested alternative input signals, or any and all other helpful information. The help signal 108 may be provided as part of an interactive sequence in which additional help signals 108 are generated based on a users 140 reply (i.e., input signal) in response to a help signal. The command processor 110 may continue to generate help signals 108 in the interactive sequence until an input signal 104 is correctly interpreted; until the command processor 110 is able to unambiguously understand the input signal 104 that resulted in the commencement of the interactive sequence; until the user 140 explicitly or implicitly terminates the interactive sequence; or the like. Alternatively, the command processor 110 may generate no help signal 108 at all and, instead, may simply drop an input signal 104 whose purpose is not automatically understood.

The command processor 110 may transmit resource actions 112 to the information resource 118 via the communication facility 132. The information resource 118 may use a command acknowledgement protocol to signal or otherwise indicate to the command processor 110 that the resource actions 112 have been received, processed, accepted, rejected, and so on. The information resource 118 may transmit an alert 114 if the resource actions 112 are not received, cannot be executed, result in or are associated with some kind of failure (such as and without limitation a syntax error, a logical failure, a system failure, and so on), and so forth. In response to the alert, the command processor 110 may reissue the resource action 112, may issue an alternate resource action 112, may redirect the resource action 112 to a second information resource 118 (e.g. in a case where the information resource 118 failed), may generate a help signal 108 as appropriate, or may initiate another response that attempts to address, respond to, and/or log the alert 114.

The alert 114 may include a technical message, which may be provided in a human-readable format. This message may be in accordance with a protocol or other communications method. The alert 114, which is also described hereinafter and elsewhere, may, without limitation, relate to a success or failure that is associated with a resource action 112. The resource action 112 and the alert 114 may be provided according to the same protocol. For example and without limitation, a resource action 112 and alert 114 may be provided according to HTTP. In this example, the resource action 112 may include an HTTP POST command and the alert 114 may include an HTTP "404" resource not found message.

The input converter 302 of the command processor 110 may include a compiler. The compiler may include a lexical analyzer, a parser, and/or another kind of input analysis facility.

A parser may conduct syntax analysis and semantic parsing on an expression within the input signal 104. The expression may be a logical expression, a textual expression, a binary expression, a hexadecimal expression, an octal expression, or any and all other kinds and/or encodings of expression. The syntax analysis may utilize a context-free grammar and may attempt to match an expression to the grammar, wherein an input signal 104 may include the expression. The context-free grammar may be relaxed so as to accept some invalid grammatical constructs. Generally, the syntax analysis may be as forgiving as possible, perhaps accepting a number of invalid grammatical constructs that are close to or can be construed to be equivalent to a valid grammatical construct. The semantic parsing may be directed at working out an intent or implication of an expression that has been accepted by the syntax analysis.

For example and without limitation, a client 102 may provide an input signal 104 that is embodied as an SMS message. This message may include a textual string. The string may be "d 153". In embodiments, "d" may be an abbreviation for "delete" and the number that follows "d" (i.e. "153") may be interpreted to be an index to something. The syntax analysis may accept this string as valid grammatical construct. Then, the semantic parsing may determine that "d" means "delete" and that "153" refers to the index of a blog posting (e.g. the $153^{rd}$ entry in a blog). Thus, the intent or implication of the expression, as the semantic parsing determines it here, may be that a blog entry with index "153" should be deleted. Many other such examples will be appreciated and may be described herein and elsewhere. All such examples are within the scope of the present disclosure.

The semantic parsing may be as forgiving as possible, such as by accepting some expressions that fail to parse or that do parse but result in ambiguous results, and may err on the side of issuing commands as opposed to generating a help signal. In other words, the semantic parsing may include making a perhaps educated guess relating to the intent of the input signal 104. This educated guess may be informed by a preference, a privilege, a history, or any and all information that may inform the educated guess. The semantic parsing may be affected by a context. This context may be associated with a user 140, a privilege 128, a skill level of a user, a static or pre-defined skill level of a user, a dynamic or automatically detected skill level of a user, and so forth. In all, the parser may determine an appropriate action given an input signal 104.

For example and without limitation, consider the foregoing example in which a client 102 provides an input signal 104 that is embodied as an SMS message provides. In that example, suppose that there are multiple blogs from which a blog entry with index "153" could be deleted. Determining what this expression implies may require answering the following question with an educated guess: from which blog should an entry with index "153" be deleted? The educated guess may be informed by the identity of a user 140, the last blog with which the user 140 had an interaction, a preference or default of the user 140, and so on. Many other such examples will be appreciated and may be described herein and elsewhere. All such examples are within the scope of the present disclosure.

Regardless of whether the input converter 302 includes a parser, an objective of the input converter may be to determine an appropriate action given an input signal 104. The appropriate action may be to generate commands. In this case, the meaning or intent of the input signal 104 either was clear or the input converter is making an educated guess as to its meaning. The appropriate action may be to defer the generation of commands. In this case, the meaning or intent of the input signal 104 may be unclear but perhaps subsequent input signals 104 will shed light on the meaning or intent; the input converter may set the unclear input signal 104 aside and revisit it later, after other input signals 104 have been received. The appropriate action may be to delegate the problem of figuring out what the input signal 104 means by transmitting a help signal 108. This help signal 108 may be directed at the client 102 that provided the unclear input signal 104. At some point after transmitting the help signal 108, a second input signal 104 may be received from the client 102, wherein this input signal 104 may be a response to the help signal 108. This response may be processed by the input converter as described in this paragraph and elsewhere herein. The appropriate action may be to discard the input signal 104, perhaps generating a log entry in the process. In this case, the meaning or intent of the input signal 104 may be so completely unclear or ambiguous and there is nothing that the input converter can do better appreciate it.

The input converter 302 may operated with reference to a rules, permissions, and preferences database 310 which may contain rules, permissions, and preferences. The rules, permissions, and preferences may be associated with users 110 and an electronic presence, service, and/or aspect thereof, any and all of which may be provided by the information resource 118 as described in detail hereinafter and elsewhere. The rules, permissions, and preferences may relate to how a particular input signal 104 that is associated with a particular user 140 or set of users 140 ought to be converted into a command 304 (or whether it should be converted into a command 304 at all). A user 140 may set a preference that is associated with himself. For example and without limitation, this preference may specify that one of a number of blogs that is associated with the user 140 is his default blog. One operational effect of this preference may be that input signals 104 that are generally directed at a blog that is associated with the user 140, but not to a particular blog that is associated with the user 140, may be, by virtue of the preference, specifically directed at the default blog by the input converter 302. Many other such examples may be disclosed herein or elsewhere, and still others will be appreciated. All such examples are within the scope of the present system. Permissions may relate to whether a user 140 may be considered a common user, an administrative user, or a super-user, as are described hereinafter with references to FIG. 7, FIG. 8, and FIG. 9 and elsewhere. Permissions may apply to a user 140 generally, in particular circumstances, in relation to particular commands 304 or input signals 104, or the like. Rules may include any and all rules that may apply to any and all aspects, elements, features, functions, and the like of the present system.

A command processor 110 may accept input signals 104 from a number of different clients 102. The input signals 104 may be received through a wired network, wireless network, cell network, or other network connection to the command processor 110. The clients 102 may be a cell phone, a smart phone, a personal computer, a handheld computer, a data feed agent, an SMTP agent, a laptop computer, or other device capable of providing an input signal 104 to the command processor 110. The input signal 104 may be a text file, an email, a voice command, a data feed, SMS message, an image, or the like. The input signal 104 may be any signal from a user 140 that may be interpreted as a command for electronic presence 223 construction, format, design, or the like.

The command processor 110 may be implemented as server architecture, executable software, scripted software, firmware, hardware, and the like, or any combination thereof.

A client 102 may be a telephone, a cell phone, a smart phone, a personal computer, a handheld computer, a data feed agent (such as and without limitation, an RSS reader, a feed reader, a feed aggregator, a news reader, and so forth), an SMTP agent, a laptop computer, or other hardware and/or software facility capable of communicating a signal between a user 140 and an automatic system, wherein the communication may involve encoding a signal from a user 140 into a binary representation and/or decoding a signal from a binary representation to a format suitable for presentation to a user 140. The clients 102 may be user-controlled (e.g. cell phone, personal computer, and the like) or automatic (e.g. data feed agent and the like). The client 102 may be operated as an interactive device, end-user device, administration device, a combination of any and all of the forgoing, and so on. The clients 102 may be operatively coupled to the command processor 110 and/or the information resource 118 using the Internet, short message service center (SMSC), PSTN gateway, or the like to provide input, receive output, or otherwise interact with the command processor 110 and information resource 118.

Figure 4:
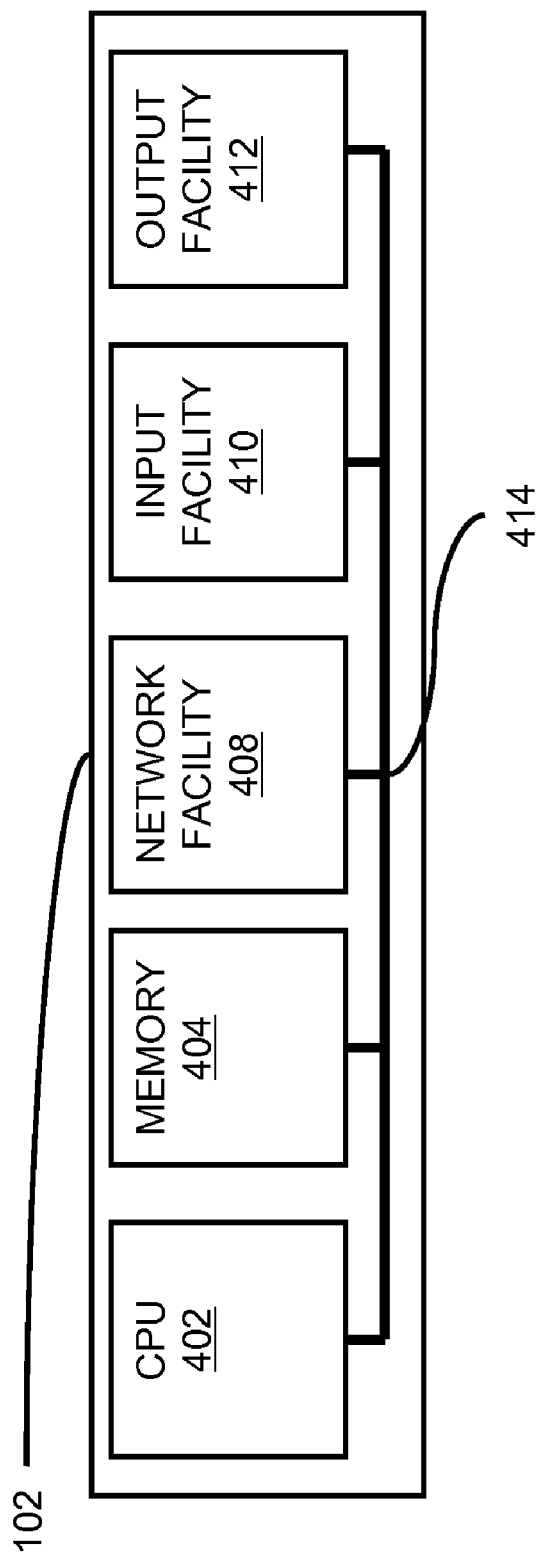
FIG. 4 depicts an expanded logical view of a client.

Referring now to FIG. 4, embodiments of the client 102 may include a CPU 402, memory 404, a network facility 408, an input facility 410, an output facility 412, a data bus 414, or the like.

The CPU 402 may provide a computing or information processing capability that is associated with receiving input from a user 140, providing output to a user 140, communicating with a command processor 110, and so on. For example and without limitation, the CPU 402 may consist of the following: a CISC processor, a RISC processor, an ASIC, an FPGA, a DSP, a memory management facility, a display driver, a CODEC, a peripheral interface, a memory interface, a power interface, a clock, a clock interface, and so on.

The memory 404 such as computer readable storage medium may consist of the following: a static memory, a dynamic memory, a write-once memory, a read-only memory, random-access memory, an EPROM, a EEPROM, a Flash memory, an electrical memory, a magnetic memory, a quantum memory, a chemical memory, fixed memory, removable memory, and any and all other types of memory. The memory 404 may include a CD drive, a DVD drive, a hard drive, a zip drive, a tape or tape drive, a memory chip, a memory card, memory on a wafer, any and all combinations of the foregoing, and the like. The memory types may be used individually or may be used in combination; some of the clients 102 may have more than one memory type.

The network facility 408 may include, support, or be associated with a physical network connection, such as may provide an operative coupling for communication between the client 102 and a command processor 110. Without limitation, the network facility 408 may be wired, wireless, IR, or any and all other types of physical network connections. The client 102 may include network facilities, each of which may include types of network facility.

The input facility 410 may include of the following facilities for receiving input: a keyboard, mouse, microphone, phone keypad, phone receiver, joystick, camera, touchpad, stylus, and the like. Any and all input received by the input facility 410 may be deliberately generated by a user 140, may be inadvertently generated by a user 140, may be a feature of a physical environment of the user 140 (such as and without limitation a background noise, light level, a magnetic orientation, a global or geographic position, an altitude, a depth, and so on), and so forth.

The output facility 412 may include a display screen, speakers (such as and without limitation computer speakers, a telephone speaker, and so on), a force feedback facility (such as and without limitation a vibrator and so on), a light, and the like.

The data bus 414 may provide information communication within the client 102, between the elements of the client 102.

A cell phone client 102 may have input facilities 410 that may include a keypad, a microphone, a camera, directional scroll facility, selection indicators (e.g. buttons), function indicators, or the like. A cell phone client 102 may have output facilities 412 that may include a speaker, an LCD screen, a vibrator, a network facility, head phone jack, short distance communication facility (e.g. Bluetooth), an ear receiver/microphone connection facility, and the like.

A client 102 may be a personal computing facility. The client 102 may have input facilities 410 that may include a keyboard, a microphone, a mouse, a camera, a joystick, and the like. The client 102 may have output facilities 412 that may include a display, at least one speaker, a network facility, and the like. The personal computing facility may include devices such as a handheld client 102, a tower computer, a laptop computer, a Blackberry, a tablet PC, and the like.

A client 102 may be an automatic computer. The client 102 may have input facilities 410 such as a data feed, a sensor, a timer, and the like. For example and without limitation, the automatic computer may include outputs such as a network facility, an LED indicator, a speaker, an ambient indicator, a display, and the like.

Referring again to FIG. 3, in embodiments, an input signal 104 to the command processor 110 may include information such as and without limitation text, audio, an image, a video, a selection, a data feed item, a sensor measurement, a clock tick, an alarm, a client context description, user information (e.g. preferences), user privilege 128 information, textual information (e.g. email or SMS message), tabular information (e.g. cell phone UI table or web form), selection information, and the like. The input signal 104 may be associated with a text message, an SMS message, an instant message, a voice message, a sequence of inputs received via a keypad or keyboard, any and all combinations of the foregoing, and so forth. The selection information may consist of a click, tap, or other such user input. The client context description may include the client 102 model, type, brand, identity, location, language, locale, software version, hardware version, user-agent string, and the like.

A help signal 108 may be directed to any and all clients 102. The help signal 108 may be directed to a client 102 that provided an input signal 104 that is associated with the help signal 108. The help signal 108 may be transmitted by the command processor 110, the information resource 118, a combination of the foregoing, or any and all other facilities. The help signal 108 may include an instruction, a suggestion, a feedback, a hint, a combination of any and all of the foregoing, or any other signal. The help signal 108 may be used to clarify the input signal 104 before or after providing a resource action 112 to the information resource 118. The help signal 108 may be a result of a resource action 112 being received, rejected, accepted, and/or processed at the information resource 118.

The help signal 108 may include data that is directed at, includes, or is associated with a JavaScript client, a text message, a web page, a voice mail message, an email message, a media file, a media file trigger, a SOAP message, an XML-RPC command, an XML message, an RSS message, or the like. The media file of the help signal 108 may include an audio file, a video file, an image file, a light show, a vibration sequence, or the like. The media file trigger may indicate to the administrative client that it is time to render a media file that may already be stored in administrative client and may have been delivered in a previous help signal 108.

In embodiments, resource actions 112 may be received by the information resource 118 and may provide, indicate, specify, suggest, define, imply, or otherwise be associated with features, functions, or methods of the information resource 118 that produce useful, concrete, and tangible results. These features, functions, methods, and results may be executed, conducted, invoked, revoked, initiated, halted, completed, reversed, undone, interpreted, compiled, provided, retracted, and so on, by the information resource 118. The resource action 112 may include a query, an enterprise function or related directive, a content function or related directive, a template function or related directive, a command or related directive, or any and all other functions, commands, or related directives.

The query may be a database query, such as and without limitation an SQL query, which may be communicated according to ODBC. In such embodiments, the information resource 118 may include a database management system.

The enterprise function may be any resource action 112 associated with an administration action such as adding a user; deleting a user; adding new data; deleting data; processing password information; defining, deleting, or updating a file, a preference, or any other data, or any and all other administration activities. The client 102 requesting the enterprise function may have administrator privileges on the system; the system may deny, ignore, or otherwise set aside an enterprise function arriving from a client that does not have administrator privileges.

The content function may be any resource action 112 that requests new or modified content information. The content function may include posting content, deleting content, modifying content, retrieving content, or the like. Content may include text, images, audio, video, sentence formatting, paragraph formatting, page formatting, text formatting, image formatting, audio formatting, video formatting, color mix and choice, and the like.

The template function may be any resource action 112 that interacts with a template of a design. A resource action 112 may activate a template element, deactivate a template element, select a template, remove a template, alter a template appearance, or the like.

The information resource 118 may be controlled by resource actions 112 from the command processor 110. The information resource 118 may generate an alert 114 in response to the resource action 112, such as an alert 114 to the command processor 110 upon which a help signal 108 is generated. The help signal may 108 notify the client 102 (and thereby the user 140) that the information resource 118 failed to operate in some manner (either requested or otherwise), or that a requested operation succeeded.

The information resource 118 may communicate with clients 102. These clients may be associated with and/or under the control of users 140 who are receiving services provided by the system 100. The communication between the information resource 118 and the clients 102 may adhere to standard communication protocols and methods, many of which are described hereinafter, still more of which will be appreciated from this disclosure, and all of which are within the scope of the present system. This communication may be unidirectional, bidirectional, full duplex, half duplex, simplex, and so on. In some embodiments, this communication may be affected by a user privilege 128 that is associated with the user 140 that is associated with the client 102 that is engaged (or attempting to become engaged) in said communication. In any case, this communication may be directed by or in accordance with a client interaction method 122 of the information resource 118. This method 122 may support general interactions between the client 102 and the information resource 118, which may include any and all possible communications in support of any and all services provided by the present system 100. This will be appreciated from a detailed description that appears hereinafter.

Figure 5:
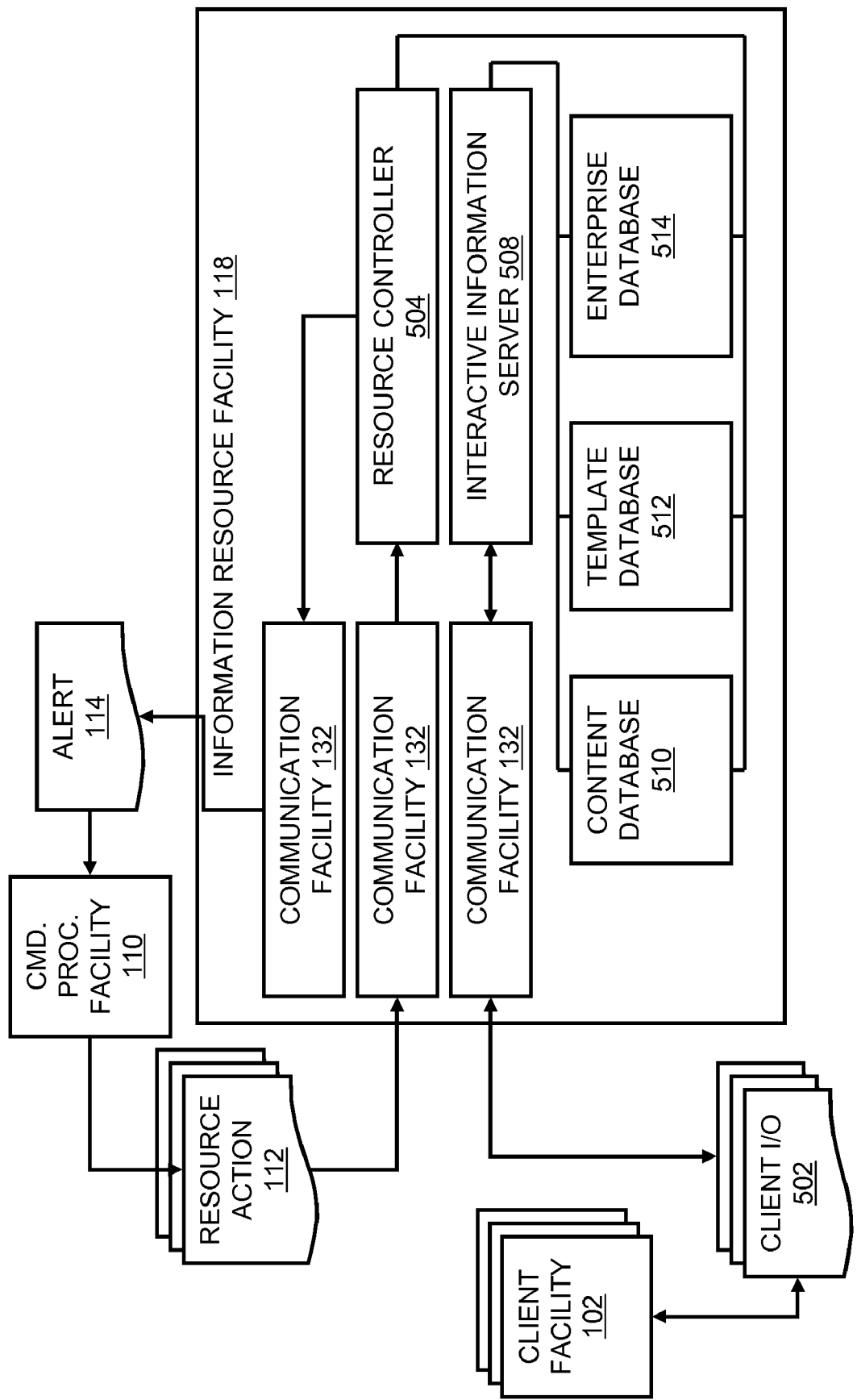
FIG. 5 depicts an expanded logical view of an information resource facility and associated methods.

Referring now to FIG. 5, an information resource 118 may provide and/or enable client I/O 502 that is associated with information services (or simply "services"), which themselves may be elements of an electronic presence. Both the electronic presence and the services may be described in greater detail hereinafter with reference to FIG. 2 and elsewhere. This client I/O 502 may include signal, which may be provided and/or received from to a client 102 such as a cell phone, a smart phone, a personal computer, a handheld computer, a data feed agent, an SMTP agent, a laptop computer, or other device capable of receiving the signal from the information resource 118. The signal may be provided as a message or sequence of messages, which may be associated with a one-way or two-way communication between the information resource 118 and the client 102. In the case of a one-way communication, one example of the message may be an SMS or MMS message that is transmitted from the information resource 118 to the client 102. In the case of a two-way communication, one example of the message may be an HTML page that is transmitted from the information resource 118 to the client 102, in response to a HTTP GET request that was first received by the information resource 118 from the client 102. One example of a sequence of messages may be a series of SMS text messages or MMS multimedia messages, each of which may embody a fragment of a textual message, wherein the textual message is too large to be transmitted in a single SMS text message or MMS multimedia message and so it is (perhaps completely) transmitted as the fragments.

The information resource 118 may receive input from the command processor. The input may include the resource actions 112. The information resource 118 may include at least one communication facility 132, a resource controller 504, interactive information server 508, content database 510, template database 512, enterprise database 514, or other similar component.

The information services may be directed at and/or adapted for a particular client 102. In one example, the client 102 may include a Web browser and the information services may be formatted and/or encoded for viewing via the Web browser and/or processing by the Web browser. In another example, the client 102 may include a cell phone display for displaying an SMS message. In this case, the information services may be formatted and/or encoded for viewing via the cell phone and/or processing by the cell phone. In still another example, the client 102 may include a Web browser with limited capabilities, such as a small screen size, a limited color depth, and so forth. In this case, the information services may be formatted in accordance with those limited capabilities. Many other information services are described hereinafter with reference to FIG. 2 and elsewhere. Still other information services will be appreciated. Any and all such information services are intended to fall within the scope of the present disclosure.

The information resource 118 may be implemented as a server architecture, executable software, scripted software, firmware, hardware, and the like, or any combination thereof.

The information resource 118 may contain a resource controller 504 that may accept resource actions 112 from the command processor, generate alerts 114 back to the command processor, modify databases (such as and without limitation 510, 512, 514), access databases (such as and without limitation 510, 512, 514), or the like.

The information resource 118 may contain an interactive information server 508 for interaction with the user's client 102. The interactive information server 508 may provide information services to the user 140, perhaps using sessions such as web sessions, WAP sessions, IVR sessions, IM sessions, and the like. Such a communication session may be compatible with a communication capability of the client 102. The interactive information server 508 may allow users 140 to access databases such as the content 510, template 512, and enterprise databases 514. The information resource 118 may include a database management system, a Web server, a WAP server, an IVR server, am IM server, or any other software or hardware server.

The interactive information server 508 may automatically generate tags to be used for search engine optimization (e.g. SEO); the tags may be associated with a Web page that is served by the interactive information server 508. The tags may be generated automatically, individually, based on startup information, by any and all other methods for generating metadata tags, or any and all combinations of the foregoing. The administrator, user, or other entity of a minisite (which may be a website embodiment of an electronic presence) may apply the individually assigned metadata tags. The tags may be assigned based on startup information, which may be gathered from a user 140.

For example and without limitation, the user 140 may sign up for an account that is associated with the information resource facility 118. This account may allow the user 140 to create a minisite or other website that is served by the interactive information server 508, information resource 118, or any and all servers and facilities of the present system 100. As the user 140 is signing up for the account, he may report that he lives in Boston and that his name is John Doe. In this example, the interactive information server 508 may insert "Boston" and "John Doe" tags into some or all of the webpages of his website. These tags may serve an SEO function. The tags may be applied to an image, page title, URL, comments, text, or any and all other components of a minisite. Without limitation, the tags may be embodied in or as image alt text, a title of a page, a metadata tag, a description metadata tag, a keyword metadata tag, a URL, a comment tag, body text, or any other part of an HTML document, XML document, or any and all other types of document.

The information resource 118 may have a content database 510 that may contain text, audio, video, multimedia, interactive programs, or any and all other types of content. Without limitation, the interactive programs may include a game, a JavaScript application, an AJAX application, or the like. The content database 510 may contain any website content, which may be combined with a website template, to produce a webpage of a website that may be communicated to the user 140 as instances of client I/O.

The information resource 118 may include a template database 512 that may provide, contain, and/or accept a website template, website designs, user-interface layouts, website styles, help pages, text fonts, formatting, and other specification or definition of a website perceptual or functional design quality. The template, specification, or definition may embody, include, or be associated with a service of an electronic presence (again, as described in detail hereinafter with reference to FIG. 2 and elsewhere). The template, specification, or definition may include a model, view, or controller, any and all of which may relate to a feature, function, or method of the interactive information server 508. The model may include a data model, a data or state that populates a data model, domain logic, and the like. The domain logic may add meaning to the data or state or draw inferences from the same. For example and without limitation, the data may specify that "today is January 1" and that "John's birthday is January 1"; the domain logic may relate this data so as to determine that "today is John's birthday." The view may be associated with the model and may be a view of the model. For example and without limitation, the view may include a user-interface layout or style (including visual aspects of the same); other perceptual qualities of the user-interface (visual or non-visual); a help message (that is, a view of a state that is associated with an error); and so on. The view may be implemented as CSS or any other style-sheet definition, markup language, or specification.

The controller may be associated with the model and may include functions of the template that are made available to the user 140 and that allow the user 140 to interact with and perhaps modify the view and/or model. For example and without limitation, the controller may allow the user 140 to select a view, modify a data or state, perform or participate in an interactive process (which may relate to a visual layout, a logical flow, and so on); and so forth. In any case, the template may define or specify a set of commands (perhaps referred to herein and elsewhere as a "command set") that the resource controller 504 may process. Apart from these commands, the resource controller 504 may, additionally or alternatively, be able to process a default or built-in command set. The command set may consist of event/action pairs and associated alerts, which may be generated in response to certain resource actions 112, events, other actions, and so on. The command set may include relatively low-level commands that operate on data, state, enterprise data, the contents of any and all of the databases (510, 512, 514, and so on), and so forth. These commands may include or be associated with resource actions 112. Without limitation, the command set may provide a layer of abstraction between the resource action 112 and the underlying databases 510, 512, 514. Those skilled in the art will appreciate the utility of this and will appreciate that this may be an optional software/system design feature.

The information resource facility 118 may include an enterprise database 514 that may maintain enterprise information such as company name, branding graphics and text, customer information, supplier information, authorized user information, user information, passwords, access-control information, logs, data backups of any and all of the databases, stored procedures, actions or event/action pairs associated with an enterprise, zone information (relating to DNS), template configuration information (including, without limitation, information and settings related to templates; active/inactive toggle states of template elements; preferred visual arrangement of template elements; website style selection; website field sizes; website color palette selection; website formatting selection or setting; and the like.

The enterprise database 514 may include template configuration information, which may, without limitation, relate to a preference, default, selection, or the like. This may specify, define, or otherwise indicate a preferred or default visual arrangement and/or feature set of a template-defined website for a particular enterprise; provide standards, defaults, preferences, or selections associated with a template that is associated with an enterprise, and the like. In other words, whereas the template database may contain a template that defines the domain of visual and functional properties of a website, the enterprise database may contain indications of which elements and options within that domain ought to be used. When the indications are combined with the template by the interactive information server, it may produce a particular view or instance of a website from within the domain of the template. This view or instance may be include HTML pages, JavaScript code, images, tags, metadata tags, hyperlinks, audio, text, style sheets, any other element of a website, or any and all of the foregoing.

Referring now to FIG. 6, a client interaction method 122 supports interaction between an information resource 118 and a client 102. This method 122 may begin with the client generating client I/O 502. This I/O 502 may include a client context 602, a get/put/post/delete command 608 or equivalent, data 610, and so forth. The I/O 502 may be generated in response to an input received by the client 102 from a user 140 through a user interface 124. The user interface 124 may, for example, be embodied in a website or webpage provided by the information resource 118. Alternatively or additionally, the I/O 502 may be generated in response to an input received by the client 102 from an automatic client process 604. In any case, the information resource 118 may receive and process the client I/O 502. In response to or as a result of this processing, the information resource 118 may generate a client I/O 502. This client I/O 502 may include a get/put/post/delete command 608 or equivalent, data 610, and so forth. The client 102 may receive this client I/O 502, which may encode, command, and/or be associated with the user interface 124. The client 102 may render the client I/O 502 as or in the context of the user interface 124. This rendition may, without limitation, include of the following: an input field, a roll-over, a hyperlink, an image, video, audio, text, and so on. Additional input from the user 140 may be received via the user interface 124, which may lead to the client 102 generating additional client I/O 502, which may be received by the information resource 118, and so on.

In embodiments the client 102 may generate client I/O 502 by combining the client context 602, appropriate command 608 (e.g. get, put, post, delete), data 610, and the like.

The information resource 118 may generate client I/O 502 for display on the client 102 by combining the generated command 502 (e.g. get, put, post, delete) with information stored in a database. The client 502 may include a display for rendering the user interface 124 or an aspect thereof.

Referring now to FIG. 1, the command processor 110 and/or the information resource 118 may be implemented according to server architecture 120. This architecture 120 may, without limitation, provide redundancy, failover, high availability, backup, recovery, rapid response times, or other such features. Various kinds of server architectures 120 are described in detail hereinafter (or elsewhere) and still other kinds will be appreciated from this disclosure. All such server architectures 120 are intended to fall within the scope of the present system.

Servers may be arranged according to a server architecture 120. The servers may include a rack-mount server, a tower server, a desktop server, an embedded server, an HTML server, an XML server, a Java-enabled server, a database server, a firewall server, a Web server, an application server, a backup server, a distributed server, a replicated server, a shared server, a dedicated server, a cluster computer, a load-balancing server, a proxy server, a client-side application, a client-side applet, a client-side script, a server-side application, a server-side applet, a server-side script, any and all combinations of the foregoing, any and all hardware server types, any and all software server types, and so on. The server architecture 120 may include a standalone server arrangement, a client/server arrangement, a three-tier server arrangement, a distributed server arrangement, a replicated server arrangement, a shared server arrangement, a dedicated server arrangement, a cluster computer arrangement, any and all combinations of the forgoing, any and all other architecture types, and so on. Methods and systems of configuring the server architecture 120 and/or or the servers arranged according to the server architecture 120 may be implemented as completely local to the server architecture 120 and/or the servers, completely remote with respect the server architecture 120 and/or the servers, a combination of local and remote with respect to the server architecture 120 and/or the servers, or any and all other methods of configuring the server architecture 120 and/or the servers.

The server may implement, rely upon, support, or be associated with the Ajax programming technique.

The three-tier server arrangement may include a server facility, database facility, firewall facility, and the like. The three-tiered architecture may also be distributed and/or replicated. The servers may be arranged according to a replicated three-tier architecture and distributed geographically and across ISPs, and the servers may be configured in a replicated/failover configuration. For example, one three-tier arrangement of servers may be designated as "primary" and may be replicated at other physical sites, any and all of which may be associated with different ISPs. Each of the replicas may replicate the logic and functionality of the primary servers, although the physical arrangement of hardware servers that constitute one replica may be identical to that of another replica or that of the primary servers. These embodiments may allow a replica to take over within seconds or less if the primary servers were to fail or otherwise become unavailable, off-line, hindered, malfunctioning, damaged, or the like.

Continuing to refer to FIG. 1, a client 102 may render help signals 108 for a user 140, such as by providing visual content in a user interface 124 or rendering other media such as audio, tactile, and so forth. The user interface 124 may also receive user input using any of the techniques described herein, or any other input techniques suitable for use with the client 102 device.

The user interface 124 may provide various levels of access. These levels of access may include common-user's level, an administrator's level, a super-user's level, and the like. The user interface 124 may be referred to as a common user interface 124 when it provides the common-user's level of access. Likewise, the user interface 124 may be referred to as an administrator user interface 124 or a super-user interface 124 for administrator's access and super-user's access, respectively. In any case, various user interfaces 124 may provide different levels of access to the various features of a minisite, website, or any and all aspects of an electronic presence. Such features and aspects may, without limitation, include designs, processes, databases (such as and without limitation the content database 510, the template database 512, the enterprise database 514, and so on), templates (such as and without limitation those in the template database 512), information (of a user, of an enterprise, and so on—perhaps any and all information in any and all of the databases 510, 512, 514, etc.), and so forth. A user interface 124 may be embodied as a website, IVR dialog, IM correspondence, e-mail message, and the like. The website may include webpages, which may be presented to a user 140 according to a privilege or preference. In some cases, the privilege or preference may be accessed and set via the user interface 124.

Figure 7:
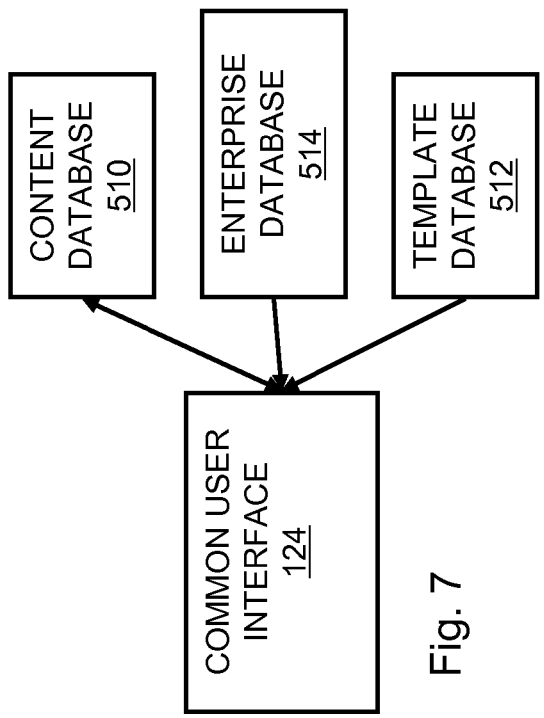
FIG. 7 depicts a logical view of a common user interface system and method.

Referring now to FIG. 7, perhaps of all the user interfaces 124, the common user interface 124 may be provide or be associated with the fewest privileges for modifying information in the databases 510, 512, 514. Via the common user interface 124, a user 140 may receive information from the content database 510. For example and without limitation, the common user 140 may be able to update text, images, audio, and other content in the content database 510. The common user interface 124 may also be associated with and subject to access restrictions that limit modifying and/or accessing certain content types or certain instances of content. The common user interface 124 may have read access to some, any, or all of the contents of the databases 510, 512, 514. The common user interface 124 may be subject to an access control such as, without limitation, a username/password access control. The access control may discern which user 140, in particular, is accessing the common user interface 124. Each user 140 may be associated with a privilege or preference for accessing the common user interface 124.

Each user 140 may have a privilege or preference associated with of the features or services of an electronic presence.

Figure 8:
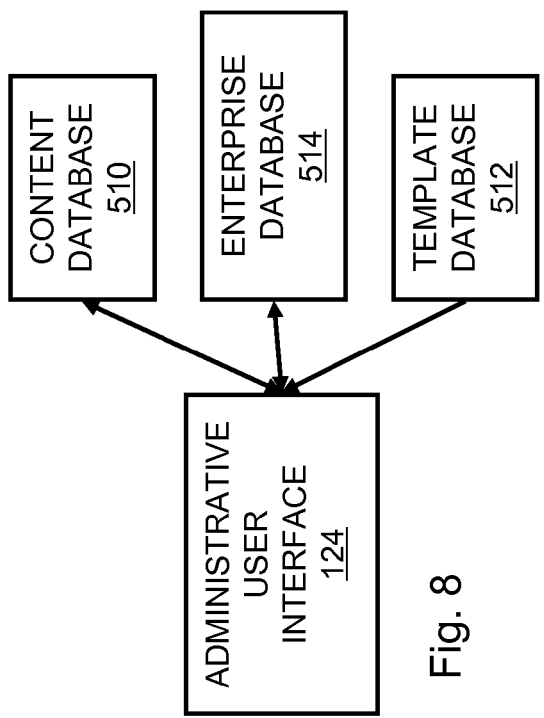
FIG. 8 depicts a logical view of an administrative user interface system and method.

Referring now to FIG. 8, in embodiments, the administrative user interface 124 may be accessed by a user 140 with administrative privileges (an "administrative user") to some or all of the features or services of an electronic presence. In embodiments the administrative user interface 124 may also have, provide, or be associated with access to the common user interface 124. Using the administrative user interface 124, the administrative user 140 may be able to access and modify the content database 510 and enterprise database 514. By accessing and modifying the enterprise database 514, the administrative user 140 may be able to influence the look of part or all of an electronic presence, website, minisite, service of an electronic presence, and so on by modifying the aspects of the enterprise database 514 that interface with or are associated with the template database 512. The user 140 may be able to modify information in the enterprise database 514 that influences the look of an electronic presence, website, minisite, service of an electronic presence, and so on such as colors, titles, field widths, and the like. The administrative user 140 may be able to edit content via a foldout view of a webpage, which may feature a simplified rendition of a page that may be a "consumer-level" technical representation of a website of an electronic presence. The administrative user interface 124 may be protected by a username/password or other such access control that serves to limit which user 140 or users 140 may access the administrative user interface 124. A number of users 140 may have access to the administrative user interface 124 via pairs of usernames and passwords. When there are more than one username/password pairs, each pair may be associated with a particular set of preferences and privileges. In other words, while two or more users 140 may have their own username and password with which to access the administrative user interface, each of the two or more users 140 may have access to different aspects of the administrative user interface 124 according to a privilege or preference; may receive the administrative user interface 124 in different formats according to a privilege or preference; and so forth.

Figure 9:
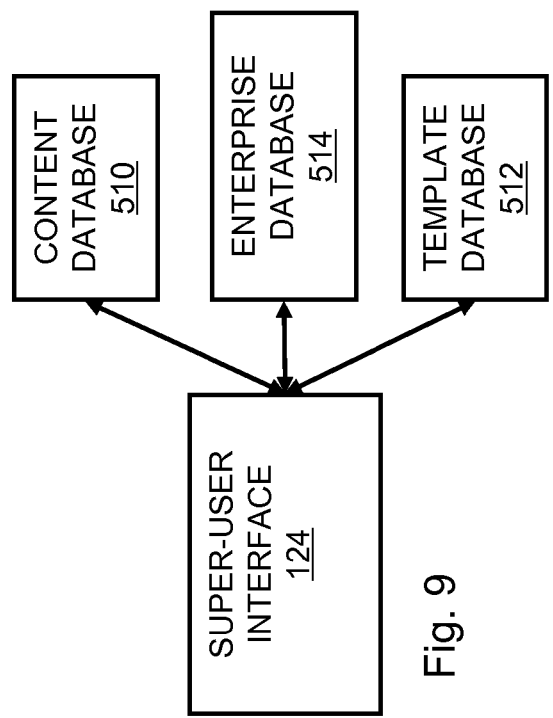
FIG. 9 depicts a logical view of a super-user interface system and method.

Referring now to FIG. 9, in embodiments, the super-user interface 124 may have, provide, or be associated with access to all aspects of any and all of the electronic presences 223, databases, templates, and the like. A user 140 may be required to provide a username and password to gain a super-user level of access. In embodiments of the super-user interface, the user 140 may issue commands directly to elements of the system via a graphical user interface, a command-line interface, or any other command interface.

In embodiments, users 140 may be provided privileges that are associated with individual aspects of an electronic presence 223, such as and without limitation site-wide privileges, minisite-wide privileges, per site section privileges, per site page privileges, per feature privileges, or the like. The user's access levels and privileges may be associated with a password control. A super user 140 may set permissions and privileges for any and all users 140, an administrative user 140 may set permissions for himself and common users, and a common user 140 may set permissions of other common users 140, if he has been granted permission to do so.

Referring now to FIG. 1, the command processor 110 and/or the information resource 118 may be incorporated or associated with a logging aspect 130. This aspect 130 may log any and all communications between the command processor 110 and the information resource 118; any and all communications between the command processor 110 and the clients 102; any and all communications between the clients 102 and the information resource 118; and any and all internal error codes, status messages, log messages, or other indicia of the performance or actions of any and all elements, sub-elements, features, functions, systems, methods, or embodiments of the present system 100.

Logging data may be saved from received information, transmitted information, processed information, or other information associated with any and all elements of a command processor, information resource 118, or client (collectively, "the system"). The logging data may be stored a server, which may be the server that originated or generated the logging data. The system may be able to log any and all steps in the processing of a command from the input received from a user 140 by the client 102, to the communication of client I/O associated with that input, to the communication of client I/O that is generated by the information resource 118 in response to the foregoing client I/O, to the rendering on the client 102 of a user interface, website, or webpage that is associated with client I/O. The system may log implicit commands such as when a mouse rolls over a certain location on a website, webpage, and so on.

Communication of input signals 104, help signals 108, resource actions 112, and alerts 114 may be enabled or conducted through a communication facility 132. Likewise, communication between clients 102 and the information resource 118 may be enabled or conducted through a communication facility 132. Various kinds of communication facilities 132 are described hereinafter and still other kinds will be appreciated from this disclosure. All such communication facilities 132 are intended to fall within the scope of the present system.

A communication facility 132 may be part of the client, the command processor, the information resource 118, or the like. The communication facility 132 may communicate using protocols such as HTTP, IM, IVR, mobile communication (e.g. SMS or WAP), SMTP, RSS, socket, pipe, ODBC, or other method of communicating between at least to computing facilities.

Any number of related technologies 134 may be supplied along with or in association with a command processor, an information resource 118, or a client 102. Without limitation, the related technologies 134 may include a style-sheet generator, a tool to design a style-sheet, an abstraction layer for SMS, a micropayment, and so forth. The style-sheet generator may generate style-sheets (for example and without limitation, as CSS or the like) that are representative of associated with the production of a representation of a miniature webpage by a web browser or the like. Alternatively or additionally, the style-sheet generate may generate a representation of a miniature webpage (for example and without limitation, as DHTML or the like). The micropayment may be generated according to a bid points mechanism, which may be described elsewhere herein or in documents included herein by reference.

The command processor 110 and/or the information resource 118 may include a related technology 134 and/or a related feature 138. These technologies 134 and feature 138 may be associated with a system or method of the present system 100 and may enable, assist, improve, modify, alter, constrain, expand, or in any and all ways affect a function, capability, feature, system, or method of the command processor 110 and/or the information resource 118. The related technology 134 and/or related feature 138 may be added to an implementation of the command processor 110 or information resource 118 at the time the implementation is instantiated; after the implementation is instantiated; from time to time; in accordance with a maintenance schedule; in accordance with an upgrade schedule; after a bug fix is implemented; after a new feature is implemented; or at any and all other times when the command processor 110 or information resource 118 may receive such technologies 134 and/or features 138. Various implementations of the related technology 134 and related feature 138 are described hereinafter and still other implementations will be appreciated from this disclosure. All such related technologies 134 and related features 138 are intended to fall within the scope of the present system.

Any number of related features 138 may be supplied along with or in association with a command processor 110, an information resource 118, or a client 102. These related features 138 may be provided by the command processor 110, the information resource 118, the client 102, and so on. Alternatively or additionally, the features may be provided via a tie-in, hook, link, or other operative coupling or association to another system. Without limitation, the features may be related to of the following: a sale, access control, a firewall, intrusion protection, content filtering, a supply chain, an affiliate, human resources, accounting, payment processing, data management, data backup, data recovery, electronic commerce, zone management (such as DNS, zone file, and so on), e-mail (such as SMTP server configuration, primary/secondary mail servers, and so on), and so forth.

Figure 2:
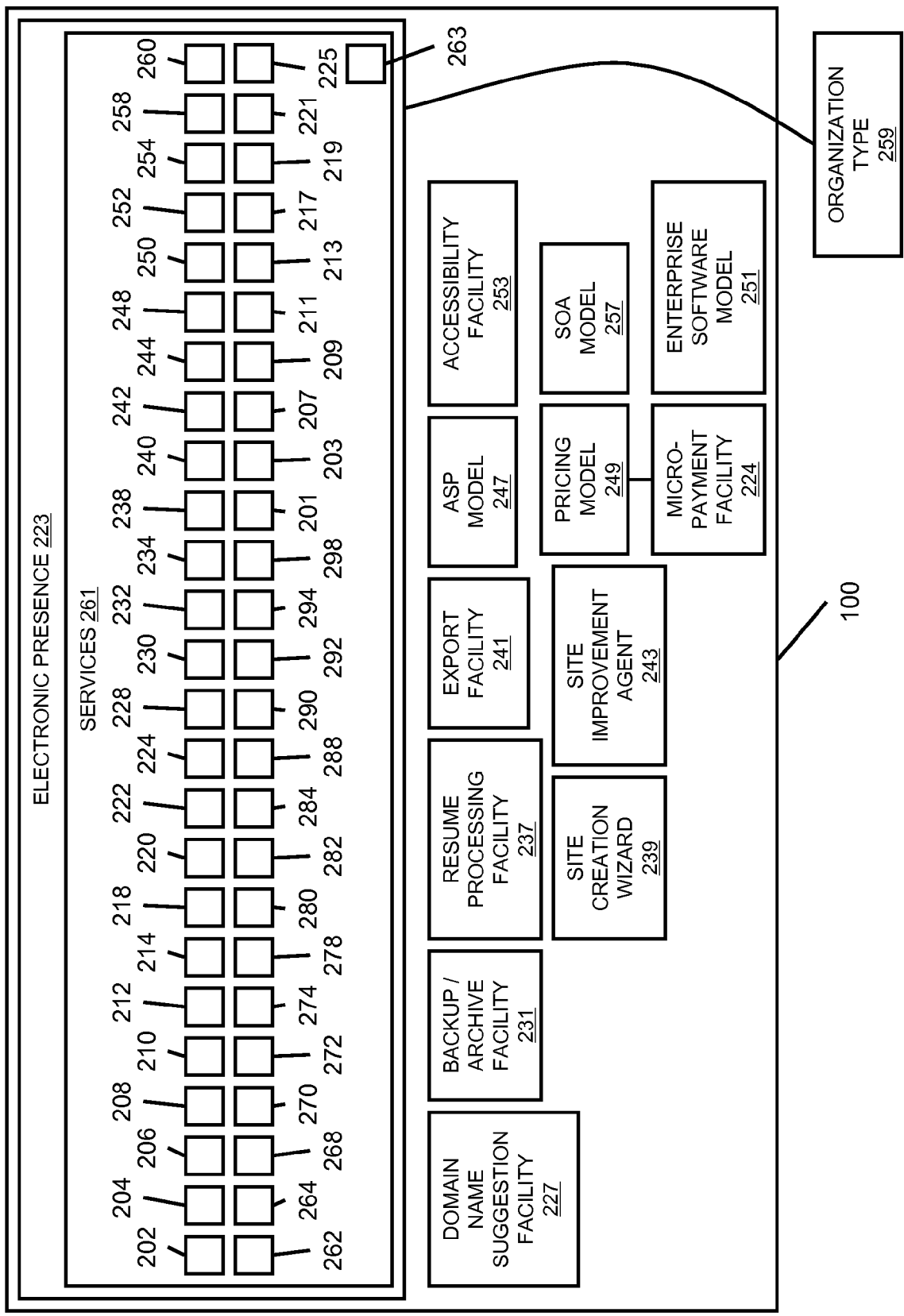
FIG. 2 depicts a logical view of the system and method of FIG. 1.

Referring now to FIG. 2, the present system 100 may include a number of electronic presences 223. Each electronic presence 223 may include any number of services 261, provided individually or in any combination. Without limitation, these services 261 may include a brochure 202, a blog service 204, a calendar of events 208, an image gallery 210, a download site 212, a contact page 214, a social bookmark 218, a multi-user calendar or event planner 220, an online store or catalog 222, a user directory 228, an electronic address book 229, a leads group 230, a user group 232, a business rating 234, a question/answer forum 240, digital storage space 242, a business service 244, a personal ad 248, a calendar 250, a classified ad 252, a domain 254, an image 258, a web design 260, a horoscope 262, an imaging facility 263, email 264, a map 268, an instant messenger 270, a mobile application 272, news 274, a notes share 278, online audio 280, information searching 282, online video 284, weather 288, electronic presence hosting 290, a computer desktop 292, mobile media 298, a universal login 201, a translation service 203, software development 207, a greeting card 209, an interest group 211, a job posting 213, a fee-based service 217, a future service or beta service 219, advertising 221, a splash page 225, and so on. A user 140 may access these services 261 using any of the clients 102 described herein. In general, it will be understood that each service will have an associated communication channel. For example, many services such as classified ads, domains, images, web designs, horoscopes, maps, and the like may be accessed using web-based communications. Other services, such as mobile media or a mobile application may employ the same underlying technology (e.g., the Internet) or an entirely separate network, along with a WAP/WML interface. Electronic mail, as another example, may employ a web-based mail system or a POP3 or other server for electronic mail clients.

An electronic presence 223 may include any number of services 261 and may be embodied as a domain application, website, minisite (i.e. an aspect of a website), interactive voice response system, instant messaging system, text messaging system, multimedia system, any other suitable system for sending and receiving communications as described herein. The term "page" as used herein refers to any unit of information provided by the electronic presence 223, such as and without limitation a webpage, an interactive voice response prompt, an instant message, a text or multimedia message, and so forth. The term "site" may refer to any and all collections of such pages, such as and without limitation a website, an interactive voice response script or session, an instant messaging script or session, a collection of text or multimedia messages, and so forth. References to a "look," "appearance," and so forth of an electronic presence 223 or an aspect thereof may refer to example embodiments of the same, provided for the purpose of illustration and not limitation. It will be appreciated, for example, that while one embodiment may have a "look" another, analogous embodiments may have a "sound," a "feel," and so on. Likewise, descriptions of an electronic presence 223 (or an aspect thereof) as "visual," "readable," and so on may refer to example embodiments of the electronic presence 223, provided for the purpose of illustration and not limitation. It will be appreciated, for example, that while one embodiment may be "visual" another, analogous embodiment may be "audible," "touchable," and so on. The term "web" may refer broadly to any and all sets of electronic presences 223. This "web" may additionally include any and all information facilities in the world, whether or not they are electronic and whether or not they are operatively coupled to a communications medium that is shared or associated with the electronic presences 223. It will be appreciated that these information facilities may include, without limitation, Internet resources (including files, websites, servers, clients, web services, news feeds, and so on), telephones and telephony systems, instant messengers and personal communications systems, libraries, books, magazines, articles, and so forth. The term "network" may refer broadly to any and all communications networks, including, without limitation, the Internet, an intranet, a LAN, a WAN, a cell phone network, a pager network, a satellite communications network, a public network, a proprietary network, or the like. References to the Internet may provide examples, for the purpose of illustration and not limitation, of an embodiment of the present system in which the network is the Internet. It should be appreciated that the present system is not restricted to embodiments in which the network is the Internet.

The electronic presence 223 may provide and/or present the service 261 to a user 140. To avail the user 140 of the service 261, the user 140 may purchase a product, a timeshare of the product, operational access to the product, and so forth. The product may be an aspect or element of the present system and may, without limitation, include of the following: the command processor 110, the information resource 118, the client 102, a related feature 138, a related technology 134, a logging aspect 130, a client interaction method 122 of the information resource 118, a user interface 124, a privilege 128, a communication facility 132, a resource action 112, a help signal 108, an input signal 104, a server architecture 120, and so on. The service 261 and/or product may be supplied to the user 140 according to a business method. The business method may, without limitation, include an application service provide (ASP) model 247, an enterprise software model 251, a service oriented architecture (SOA) model 257, a pricing model 249, and the like. The pricing model 249 may include a minimum base price and/or fees for particular services. The minimum base price may, without limitation, include: a one-time fee, a recurring or periodic subscription fee, a service package fee, a fee for an individual service or an a la carte fee, and so on. The minimum base price may be based on the number of minisites associated with a particular user, the types of those minisites, the bandwidth usage of a minisite (or extraordinary usage thereof), use of a telephony feature or other telephony activity (or extraordinary usage or activity thereof), a quantity of items sold via the product or service, a percentage of revenue generated from a sale of items via the product or service, and so forth. The pricing model 249 may include a fee for payment processing; advertising; featuring a minisite in a directory of minisites; a custom minisite application, feature, or design; a premium application, feature, or design of a mini-suite; and so on.

The pricing model 249 may be associated with a micropayment facility 224. This facility 224 may deduct an amount from a financial account of the user 140 and deposit that amount (or some portion thereof) into financial accounts that may be associated with electronic presence 223 and/or service 261 providers. This amount may be converted into bid points. Each bid point may include a discrete and fungible instrument or voucher that may have a cash value. The bid points may be stored in a bid-point account of the user 140. The bid-point account may include entries in a database. The prices and/or fees associated with the pricing model 249 may be expressed in terms of bid points. As the user 140 utilizes systems, methods, functions, features, services, and the like, some number of bid points may be deducted from the user's 140 bid points account. As the decreasing number of bid points in the account reaches or transitions past a minimum value, the user 140 may be required or requested to add bid points to his account. The adding of bid points to the account may be automatic (e.g., an automatic "top off" that brings the number of bid points up to a particular target value); manual (e.g., a reminder to top off a bid points account may be transmitted to the user 140 and an instruction to top off the account may be received from the user); or according to any and all other methods of top-up, top-off, replenishment, and so forth. In any and all cases, increasing the number of bid points in the account may be associated with the deducting the amount from the financial account of the user 140 and depositing that amount (or some portion thereof) into the financial accounts that may be associated with the electronic presence 223 and/or service providers.

The micropayment facility 224 may enable the use of a coupon, pre-paid financial instrument, promotional code, or any and all other forms of alternate payment in lieu of or in addition to the deducted amount from financial account of the user 140. In this way, some or all of the amount may be defrayed by the alternate payment. The user 140 may be able to redeem bid points in order to receive a coupon, pre-paid financial instrument, promotional code, and the like, which may be transferable to another user 140. The user 140 may be able to redeem bid points in order to receive an amount deposited into his financial account. An administrator or operator of a system that is implemented according to the present system may be able to manually deposit or configure the automatic depositing of bid points into the user's 140 bid-point account. For example and without limitation, the administrator or operator may issue a refund of bid points to the user 140. For another example and also without limitation, the administrator or operator may configure the automatic depositing to occur periodically, perhaps as an incentive to the user to use bid points. The administrator or operator may configure a promotion in which the user 140 automatically receives a certain number of bid points in response to a trigger and/or an action of the user 140. For example and without limitation, the promotion may be a frequent flier promotion in which the user 140 automatically receives bid points in response to the user's 140 completion of air travel. Many other such examples may be described herein or elsewhere, and still others will be appreciated. All such examples are within the scope of the present system.

The electronic presence 223 may be accessible via a URL. The application may include a default set of things that people see or otherwise receive when they visit the URL. The URL may include the construct www.easyonme.com/user_name; user_name.easyonme.com; www.user_name.com; and so on, wherein easyonme may be the name of a company providing the electronic presence 223, user_name may be the name of a customer of the company on whose behalf the company is providing the minisite. The electronic presence 223 may relate to, be associated with, or provide any and all of the services 261. For example and without limitation, an electronic presence 223 may include a brochure 202, a blog service 204, a calendar of events 208, an image gallery 210, a download site (from which, for example and without limitation, a user 140 may download and/or upload a music file, an image file, a data file, an MP3 file, a PowerPoint file, and so on); a contact page 214 (or an "About Me" page) for providing the name, address, phone number, e-mail address, URL, or other contact information about a user; social bookmarks 218 (a la de.licio.us); a multi-user calendar or event planner 220; an online store or catalog 222; and so on. In embodiments and without limitation, an electronic presence 223 may be directed at a governmental agency; a Web master; an educator or teacher; a business organization (such as and without limitation a chamber of commerce); a restaurant; a veterinarian; and so on. When the electronic presence 223 is directed at a restaurant, it may include a restaurant menu creation tool, which may allow a user 140 to modify a restaurant menu of the minisite by sending an e-mail message to a product or service of the present system. When the electronic presence 223 is directed at a veterinarian, it may include a feature for setting prices that depend upon the size of an animal, whether the animal requires boarding, whether the animal is a farm animal, and so on. The electronic presence 223 may be associated with or provide compliance with a federal accessibility law, which may apply to the appearance or layout of a minisite, or to a disclaimer, notice, capability, or other aspect of the minisite. The electronic presence 223 may provide or be associated with rebranding the minisite. For example and without limitation, a minisite may appear to be completely owned and operated by a user 140, perhaps without reference to the company that is actually providing the minisite.

Additionally or alternatively, the present system 100 may include any number of facilities that may provide complementary or auxiliary systems and methods in association with the electronic presence 223. These systems and methods, without limitation, may include a domain name suggestion facility, 227; a backup/archive facility 231; a system usage method 233; a resume processing facility 237; an electronic presence creation wizard 239; an export facility 241, a site improvement agent 243; an application service provider (ASP) model 247; a pricing model; an enterprise software model 251; an accessibility facility 253; a service oriented architecture (SOA) model; and so on.

A universal login 201 service may allow a user 140 to log into many different electronic presences 223 using one account ID. A user 140 may log into the universal login 201 service once during a session to establish a time limited ID that may be used for logging into other web sites.

A global authorization cookie may be saved to the users' client 102 when logging onto the universal login 201 service. When the user 140 may be asked for authorization at a new electronic presence 223, the global authorization cookie may be transmitted to the electronic presence 223 as the user's authorization.

The global authorization cookie may be perishable or be valid for a finite period of time or a finite number of authorizations. The global authorization cookie may be removed from the user's 140 client 102 once the user 140 logs off of the universal login 201 service.

The universal login 201 information may include the user's ID, user's password, password question reminder, or the like.

The translation service 203 may be a web based service, client 102 based application, or the like. A user 140 may wish to translate a word, phrase, sentence, paragraph, webpage, website, or the like into another language such as English, German, French, Spanish, or the like. The translation service 203 may operate on input text using, e.g., a text box or other input field to receive a word, phrase, sentence, paragraph, or the like for translation into another language. The translation service 203 may have a limit on the number of words, characters, or the like that will translate for a user. The translation service 203 may provide for independent selection of a "to" and "from" language, or may receive selection of a specific to-from pair according to the capabilities of the translation service. The service 203 may also, or instead, operate on entire web pages or the like by receiving a reference to a source for translation and providing, in response, a web page or other translated rendering of the source. The translation service 203 may also, or instead, output text or audio of the translated material. The translation service 203 may allow the user 140 to view the webpage in the original language by selecting a button, link, or the like.

The blog service 204 (e.g. web log or, in the common parlance, a "blog") may be a personal electronic presence 223 where a user 140 publishes information that could include opinions, news, personal diary entries, collaboration with other users, images, video, audio, user interactions, or the like. A blog service 204 may be a public blogging electronic presence 223 (for example, such as Slashdot) where a collection of users 140 may publish information. The user 140 may have complete control of the contents of the blog service 204. The blog service 204 may allow the user 140 to publish information to the Internet that may be read or viewed by anyone connected to the Internet. As a user 140 adds new information to a blog service 204, the new information may be added to the top of the blog service 204 and/or may be published in a news feed (such as and without limitation, an RSS feed). In this manner, it may be easy for other users 140 to view the new information that may have been posted to the blog. An administrative user or super user (or, perhaps, any user) may configure the blog service 204 to allow the posting and/or deletion of any and all comments, to allow the posting and/or deletion of certain comments, to block comments from certain users 140, or the like. A user 140 of the blog service 204 may respond to comments. The received comments may be displayed in the order they were received/responded to, thereby providing a sort of conversation for users 140 to follow and, perhaps, to provide further comment.

The blog service 204 may be provided on a group-access basis, whereby families, teams, groups, organizations, and the like may share information, images, video, or the like to members of a group (that is, users 140 that are associated with the group). Access to the group-access blog service 204 may be limited to the members of the group. A blog profile may be published to allow other blog users 140 to find blogs of interest. The blog profile may include the type of information kept in the blog service 204, access to the blog service 204, if comments are permitted, samples of blog text, tags or metadata associated with the blog, or the like. Text, images, video, or any content may be shared on a blog service 204 by uploading a file containing the content to the blog service 204. An audio file may be posted to a blog service 204. The audio file may be uploaded from a client 102, posted using a phone, or the like.

Software development 207 services may be implemented as any service to aid electronic presence 223 developers in the development of electronic presences 223. The software development 207 service may provide various electronic presence 223 enhancement tools, services, APIs, and the like. A user 140 may be able to associate the various electronic presence 223 enhancements with electronic presences 223 that are being developed by the software developer. The software development 207 services may provide the user 140 with a user interface 124 (UI) to search for the available enhancements. The UI may also be used to create, edit, store, or the like the users 140 new or existing electronic presence 223. The UI may be a complete electronic presence 223 development interface. The enhancements may include maps, shopping, product search, location search (e.g. businesses close to an entered location), electronic presence 223 developer language support (e.g. PHP), electronic presence 223 templates, RSS feeds, audio feeds, business promotion, business checkout, travel planners, and the like APIs. The user 140 may download the API to a local client 102, access the APIs on the software development 207 service, upload an electronic presence 223 to the software develop service for enhancement, or the like. Once the user 140 has access to one of the APIs, the user 140 may be able to access the functionality of the APIs for use on the users 140 electronic presence 223. For example and without limitation, the user 140 may gain access to a map API and may be able to use the map API functionality to place directions to the business location on the electronic presence 223.

The software development 207 service may also provide an interactive interface for the user 140 for electronic presence 223 design suggestions. The user 140 may use a wizard to develop an electronic presence 223 by answering questions related to the design of the electronic presence 223. The user 140 may interact with the wizard as the electronic presence 223 is developed.

The software development 207 service may be a free service, a paid service, a subscription service, or the like. A free service may provide a limited access to the API functionality. A fee or subscription service may provide access to all API functionality.

An electronic calendar 250 service may allow a user 140 to view and manage a calendar event 208 service on a client 102. The client 102 may include a desktop computer, laptop computer, server, web server, handheld computer, smart phone, personal digital assistant (PDA), or the like. The electronic calendar 250 may display user 140 defined time periods that may include hours, a single day, more than one day, a week, a month, a year, or the like. In embodiments the calendar 250 may provide controls to advance to the next defined time period.

The defined time periods may be further divided into user 140 defined time intervals. For example and without limitation, the user 140 may have each day of the calendar divided into 15 minute time intervals.

The calendar 250 may allow a user 140 to increase or decrease the duration of the time periods displayed to show more or less detail on the calendar 250. For example and without limitation, the user 140 may initially display a month; the user 140 may be able to change the viewed calendar to multiple months or to a week. The user 140 may be able to continue to increase or decrease the time periods displayed until a desired time period is displayed. Even if appointment detail cannot be displayed (e.g. a month is displayed), the calendar 250 may provide an indication that there are appointments on a day. For example and without limitation, the month calendar may indicate there are appointments by a color indication, shading, or the like.

The user 140 may be able to store activity information via the electronic calendar 250 into the calendar of events 208 that may include personal appointments (e.g. doctor), business appointments, social appointments, vacation time, meetings, important personal dates, or the like. The electronic calendar 250 may allow the user 140 to enter an appointment and then indicate that the appointment is a recurring appointment. The electronic calendar 250 may schedule the appointment for the same time period using a user 140 defined repeating time period. For example and without limitation, the user 140 may set a meeting for a Tuesday at 12:00 pm. If the user 140 indicates that the meeting recurs once a week, the calendar 250 may schedule the meeting every Tuesday at 12:00 pm.

The electronic calendar 250 may enable or be associated with sharing the calendar of events 208. The calendar of events 208 may be stored on a first client 102 from which a second client 102 may access it over the network. The calendar of events 208 may include a shared calendar of events 208 with more than electronic calendar 250 accessing the calendar of events 208 at the same time, at different times, or the like.

The electronic calendar 250 may provide a user 140 with reminders that a meeting time is approaching. When the user 140 is entering an appointment on the electronic application 250, the user 140 may indicate that the calendar 250 should send a reminder that the appointment is approaching; the user 140 may be able to indicate the time period to send the appointment. For example and without limitation, a user 140 may set a meeting for 12:00 pm and set the reminder for 15 minutes before the meeting. The electronic calendar 250 may provide the user 140 with a reminder at 11:45 am. The reminder may be displayed by a pop-up window, flash window, on an operating system activity bar, as an email, an instant message, a phone call, a text message, or the like.

An electronic card 209 service may enable a user 140 to create and send electronic cards 209 to other users. Electronic cards 209 may be invitations to an event, reminder of an event, thank you cards 209, business related notes, personal cards 209, greeting cards 209, or the like. The electronic card 209 service may have templates for a number different events 208, topics, cards 209, or the like. For example and without limitation, the user 140 may want to send invitation cards 209 to an open house. The user 140 may be able to select an appropriate template from a list of available templates. The templates may have backgrounds and color schemes that the user 140 may add the particular information for the open house.

The user 140 may be able send the electronic card 209 to a distribution. For example and without limitation, the user 140 may have a list of businesses that the user 140 wishes to invite to a grand opening of a business. The user 140 may send the invitation and may be able to set a reminder of the grand opening. For example and without limitation, the invitation may be sent on week one with a reminder of the open house to be sent on week two. The reminder may be sent automatically. The reminder may user 140 the same template, other template, or the like.

The user 140 may be able to merge the electronic card 209 with the list of business to send the electronic card 209 to the businesses. The list may include a name, email address to send to, business, business type, or the like. The list may be a database, relational database, a table, a file, a spreadsheet, a document, or the like.

The electronic card 209 may be sent to an individual person. The individual card 209 may be a business card, greeting card, or the like. The user 140 may be able to enter the email address of the person that will receive the electronic card.

The electronic card 209 may contain static images such as a picture, contain animated images, contain video, contain an audio file, or the like. The user 140 may select from an available audio file, video file, or the like or the user 140 may be able to create a custom file.

The electronic card 209 may be sent using conventional hardcopy mail.

An imaging facility 263 may be a service 261 that allows a user 140 to access, catalog, organize, annotate, or modify image characteristics; share images across a network; store images; sort images; or the like. The images may be captured with a digital camera, digital video camera, cell phone, PDA, scanned image, or other device capable of creating an electronic image file.

The imaging facility 263 may be web based, network based, individual client 102 based, or the like. The client 102 may include a desktop computer, laptop computer, server, web server, handheld computer, smart phone, personal digital assistant (PDA), or the like.

The user 140 may use an image interface to view images, sort images, share images, modify images, organize images, or the like. The images may be viewed as a thumbnail image, a filmstrip, an icon, or the like. The images may be shown as a grid of images, on a tree of images, images within a directory tree, a combination of views, or the like.

The imaging facility 263 may allow the users 140 to modify the image characteristics by modifying color, contrast, lighting, zoom, crop, straighten, remove red eye, apply image effects (e.g. black and white or Sepia), sharpen, tint, or the like.

The imaging facility 263 may provide a presentation capability where images may be viewed in a sequence. The sequence may be automatic, user 140 defined, a subset of images, all the images, or the like. The user 140 may be able to indicate the timing between each image, transitions between the images, or the like.

The imaging facility 263 may allow a user 140 to share the images across the network. The sharing may allow other users 140 to view images from other client 102s connected to the network. The user 140 may be able to define the other user 140 access permissions, define the users 140 with image access, define access to all images, define access to a subset of images, or the like.

Interest groups 211 may be implemented as a service by providing an aspect of an electronic presence 223 for users 140 to share a common interest. The aspect of the electronic presence 223 may be a website, webpage, minisite, chat room, any and all forms of electronic presence 223, or the like. An interest group 211 may be a business group, community group, family group, political group, hobby group, sport group, religious group, education group, computer group, game group, health group, personal group, support group, or the like.

In embodiments, users 140 that are already part of an interest group 211 may invite other people to become part of a user group. For example and without limitation, a user 140 that is part of a flower group may send an email, text message, phone message, pager message, or the like to invite another person to attend the next group meeting. The group may not meet at regular times. The group space may always be open with users 140 entering and leaving as their schedules permit. The users 140 may interact live, interact by posting messages, interact with a text messaging application, or the like. For example and without limitation, the user groups may use a chat room type application to communicate in the group. In another example, the users 140 may communicate by posting a question, statement, or the like to which other users 140 may respond. The interest group 211 service may maintain a history of the posted information.

The interest group 211 service may provide a conversation history for the group, allow shared images, allow shared video, have a calendar for planning, have polling for users 140 to vote on topics of interest, may have links to electronic presences 223 of interest to the group, or the like.

There may be a search capability within the interest group 211 service to find groups that may interest the user. For example and without limitation, the user 140 may be interested in dog training and may be able to search all the groups to find the groups related to dog training. The user 140 may then be able to join one of the listed groups. Job posting 213 may be implemented as a service for a user 140 to find a job, businesses to post job openings, or the like. The job posting 213 service may be similar to an advertising site where jobs are advertised to perspective users. The job posting 213 service may provide tools for a business to present a job opening, search capability for the user 140 to find a job, tutorials on resume writing, tutorials on interviewing skills, salary calculators to determine a starting salary, or the like.

The business may be provided with tools to create a job posting 213 that will attract a user. For example and without limitation, the job posting 213 service may, depending on the job type, suggest keywords, images, presentation, provide templates, or the like to the business. There may be a job posting 213 wizard that may guide the business through the job posting 213 creation process. For example and without limitation, the business may indicate the type of business they are and the wizard may present a questionnaire for that type of business. The answers to the questionnaire may create the job posting 213.

There may be job search capabilities for the user 140 to find a job. The user 140 may be able to enter keywords, indicate a city to search, indicate a distance from the city to search, select a particular job type (e.g. engineering), or the like. The job search service may return a list of jobs matching the search terms that user 140 entered. In addition to the returned list, sponsored links may be returned that may be related to the returned list. For example and without limitation, if the job search was for "engineering", a list of available engineering jobs may be returned along with advertisements for engineering firms that may be looking for new employees.

The job posting 213 service may post jobs by category. The user 140 may be able to browse categories of jobs that the job posting 213 service has grouped. The category may also have sub-categories. For example and without limitation, the user 140 may browse Engineering and there may be civil, electrical, chemical, mechanical, computer, and the like listed for the sub-categories. The browse listing may include a brief description of the job, a detailed description of the job, the company name, the company location, the date the job was posted, and the like. Additionally, the user 140 may be able to search for jobs by state; each state category may also have sub-categories of the cities within the state that have jobs.

If the user 140 finds any of the jobs listed interesting, the user 140 may be able to send a response to the interesting job. The response may include sending personal information, an ID provided by the job search service, request for an interview, a resume, contact information, or the like.

There may be a resume builder 252 service for the user 140 to create, modify, maintain, update, or the like a resume. The resume builder 252 may have a number of templates that the user 140 may use to create the resume. The templates may be by type of job desired. There may be a resume creation wizard that may present a questionnaire to the user. Answer to the questions may build the users 140 resume. The user 140 may edit the resume by re-entering the wizard, manually editing, or the like.

The job posting 213 service may provide help in job interviewing. The job posting 213 service may provide tips to a good interview, give sample common interview questions, provide sample good interview answers to the common questions, and the like. The user 140 may be able to provide a written answer to the sample interview question and the job posting 213 may provide a response to the user 140 on the quality of the answer.

Electronic presences 223, services, network services, business, enterprises, or the like may provide information about future services 219 that may be considered for future release. The future services 219 may be new businesses, new applications, new versions of existing applications, or the like. The future services 219 may be displayed as a list, a set of links, a document, or the like. For example and without limitation, the business may provide a webpage with a set of links that a user 140 may select to view a preview of the future service 219, download a new version, download a trial version, download a beta version, or the like.

The future service 219 may be on the business electronic presence 223, perhaps enabling users 140 to try the future service 219 and, perhaps, to provide comments relating to the future service 219. The user 140 may be able to try the future service 219 remotely on the web, locally on the user's client 102, or the like. The enterprise may provide the user 140 with an electronic presence 223 location in which the user 140 may post comments to the enterprise on the operation of the future service 219. The enterprise may use the comments to make further improvements to the future service 219, release the future service 219, cancel the future service 219, or the like.

A user 140 may need to be a subscriber to the enterprise to have access to the future services 219. Some future services 219 may be provided to any user, and other future services 219 may be provided just to subscribers.

Future services 219 that are provide for use may be reduced versions of the future service 219 by not providing all the functionality of the soon to be released final service. This may be done to find interest in the future service 219.

In embodiments, once a future service 219 is released for general use by users, the future service 219 may be removed from the future service 219 electronic presence 223.

An advertising 221 service may provide advertising on web pages as banners, flash pages, popup pages, or the like. The advertising 221 may contain static information (e.g. text or images), audio, video, animation, or the like. Advertising 221 may be placed randomly on an electronic presence 223, systematically on an electronic presence 223, by advertised content, by webpage content, or the like. Advertising 221 may be communicated to an offline advertising outlet, such as and without limitation a print media outlet, an outdoor advertising outlet, an alterative advertising outlet, a digital signage media outlet, and so forth.

Advertising 221 may have an indicator of the type of advertising 221 contained in the advertising 221 to provide a method of linking advertising 221 to webpage content. The method of indication may be a tag.

The advertising 221 on the webpage may be static, dynamic, or the like. A static advertising 221 may be part of the webpage design and may be changed periodically by the web master as may be desired by the webpage owner. A dynamic advertising 221 may be continually changed while the webpage is displayed to the user. The changing of the webpage may be on a set period, random periods, or the like. For example and without limitation, a certain location on the webpage may have change advertising 221 content every 15 seconds. There may be a list of advertising 221 that are used to dynamically link the advertising 221 to the webpage. The list may be a database, relational database, table, spreadsheet, file, document, XML file, or the like.

The electronic presence 223 may be responsible for the advertising 221 displayed on the webpage. An advertising 221 service may be responsible for placement of the advertisement, or the like. If an advertising 221 service is used to place the advertisement, the service may use compatible advertising 221 indicators to match the advertising 221 to a webpage.

A splash page 225 service may be used to provide information to a user 140 in advance of or in addition to information provided to the user by another service 261; the splash page 225 may be displayed over and/or prior information provided by another application or service 261. The splash page 225 may be displayed as a full screen, partial screen, or the like. The splash page 225 may be displayed for a set time period; may be persistently waiting for the user 140 to provide an input; may present options from which the user 140 may select; or the like. The splash page 225 may include a login page, an advertisement page, password requirement (e.g. once/time period), an associated electronic presence 223, a video stream, an audio stream, an electronic presence 223 pop-up page, a software introduction page, a software install screen, software update notice, a electronic calendar reminder, a software/web help page, a software about screen, an interactive graphical user interface, or the like.

The login screen may be used to request login information from the user 140 while blocking the view of the application. For example and without limitation, a user's personal picture site may have a login splash page 225 that covers the application window, electronic presence 223, or the like to prevent viewing the window until the login information is entered. The user 140 may be prevented from interaction with the application until the login information is entered.

The advertisement page may be a splash page 225 that is displayed over an electronic presence 223. The advertisement page may be persistent until the user 140 closes the splash page 225. The advertisement page may present other linking options to the user. The advertisement page may use a tag to associate with a certain electronic presence 223 (or an aspect thereof), may be a paid sponsor, may be an affiliate, or the like.

The password requirement page may be a splash page 225 that is displayed after an application has been idle for a set time period, at a certain time period, at random time periods, when first entering an application, or the like. The password page may be displayed the first time the user 140 enters or accesses the electronic presence 223 may be displayed periodically during the use of the application or the session. For example and without limitation, a computer operating system may determine the client 102 has been idle for a set time period and may present a password page before the user 140 can continue with working on the computer. The password page may be persistent, requiring the user 140 to enter a password before continuing to access or otherwise utilize an electronic presence 223 (or an aspect thereof).

The associated electronic presence 223 may present the user 140 with a page advertising another webpage that may have similar content as the electronic presence 223 being viewed. For example and without limitation, a user 140 may enter an electronic presence 223 related to swimming pools and an associated electronic presence 223 page may be displayed that advertises an electronic presence 223 for pool accessories. The other electronic presence 223 may be a paid sponsor, paid affiliate, related to a tag of the original electronic presence 223, or the like. The associated electronic presence 223 page may be persistent, displayed for a period of time, shown as a bar at a location on the webpage, or the like.

The video stream page may be a media player splash page 225 that plays a video stream from an electronic presence 223. The video stream page may open at the request of the user, open automatically, or the like. For example and without limitation, the video stream page may be opened when a user 140 selects a video clip from an electronic presence 223, the user 140 may click on the video clip and the video stream page may be displayed to run the clip. In another example, a video stream page may automatically open and run with the opening of an electronic presence 223. The video stream page may close after the video clip has completed.

The audio stream page may be a media player splash page 225 that plays an audio stream from an electronic presence 223. The audio stream page may open at the request of the user, open automatically, or the like. For example and without limitation, the audio stream page may be opened when a user 140 selects an audio clip from an electronic presence 223, the user 140 may click on the audio clip and the audio stream page may be displayed to run the clip. In another example, an audio stream page may automatically open and run with the opening of an electronic presence 223. The audio stream page may close after the audio clip has completed.

Software pages may present splash pages 225 when an application opens, to show information, to provide suggestions, or the like. For example and without limitation, a game application may present an opening video clip in a software page at the opening to the game. The game may also present scores, hints, progress information, overall views of the game, and the like in a software page. In another example, an application may display a suggestion on a better way to use the application based on the action the user 140 just performed. For example and without limitation, a spreadsheet application may track the way a user 140 is filling in the cells of the worksheet and may suggest a better method of filling in the cells.

Software install pages may present splash pages 225 to display install information, buttons to select the next action, show progress information, or the like. There may be more than one software install page displayed at once.

Software update pages may present splash pages 225 to notify a user 140 when updates are available, needed, or the like. For example and without limitation, the user 140 may be using a document viewing application that periodically checks for software updates. The information that an update is available for installation may be presented as a splash page 225 to the user. The software update pages may be displayed over the application and may be persistent until the user 140 closes the software update page. The software update page may prevent interaction with the application until the user 140 closes the software update page.

Electronic calendars 250 may present calendar reminder pages to users 140 as an appointment time approaches. A user 140 may store an appointment on an electronic calendar and set a reminder indicator to remind the user 140 of the appointment at a time period before the meeting; the reminder may be displayed as a splash page 225. For example and without limitation, a user 140 may request a reminder to give the use enough time to get to the meeting. The reminder may be displayed on the users 140 computer as a splash page 225 showing the required meeting information. The calendar reminder page may be displayed over any application that is executing on the computer.

Application and web help screens may be displayed as splash pages 225. The user 140 may request help for a specific function of an application, request general help for the application, or the like. If a user 140 request help, the application may display a help page that may display the requested help, display a search page for more information, or the like. For example and without limitation, an application window may have a button with a "?" that the user 140 may click and drag to a window feature to request information about the feature. The help information may be displayed in a splash page 225 over the application.

Software "about" information may be displayed as a splash page 225 to provide information about the software. The software information may include application name, application serial number, application version number, company information, contact information, developer information, or the like. The software "about" splash page 225 may be displayed over any executing application. The software "about" splash page 225 may be persistent until the user 140 closes the application.

Continuing to refer to FIG. 2, in embodiments, a domain 254 may be provided as a service 261 of an electronic presence 223. The domain 254 may be a domain name or host name that may provide a recognizable name that corresponds to a numeric IP address. Translation between name and IP address may be provided by a Domain Name System (DNS). The domain 254 may allow for a network resource (such as a server, a file, and so on) to move to and/or be associated with a different IP address. This may be associated with the network resource changing physical location in the topology of the Internet (or another internetwork). A URL may include the domain 254 is the name that may be entered into a web address of a web browser; the domain 254 web address may then direct the browser to the IP address of the domain 254.

Domains 254 may be managed by domain 254 registration services (i.e. a "registrar") such as Network Solutions, Register.Com, and the like. These registration services may setup a domain 254, maintain a domain 254, move a domain 254, or the like. These registration services may provide all the domain 254 services to a user 140 (or, generally, a "registrant"), provide a user interface 124 for user 140 maintenance, or the like.

There may be domain 254 name registration services that are user 140 driven by providing a user interface 124 that may allow the user 140 to create a domain name, register the domain name, manage the domain name, associate web pages to the domain name, create domain name email addresses, or the like.

A user 140 may create the domain name by first searching the Internet for the domain 254 name that the user 140 desires to determine if the domain 254 is already in use. For example and without limitation, the user 140 may want the domain 254 name "TheDomainName.Com". The user 140 may first enter that name into a registration search engine to determine if the requested domain 254 name is already in use; duplicate domain 254 names are not permitted. If the domain 254 name is already in use, the user 140 may try a different version of the domain 254 name. If the domain 254 name is not in use, then the domain 254 name may be available for the user 140 to purchase and use. The domain 254 name may be changed by selecting a different suffix that may include .com, .net, .org, .us, .info, .name, .biz, .de, .tv, .uk, .cc, .bz, or the like. When a user 140 searches for registered domain 254 names, the registration service may suggest other similar domain 254 names that are not in use.

The web registration service may provide services that may include customer service, domain 254 management, private domain 254 registration, web page creation, domain 254 locking, domain 254 forwarding, email forwarding, and the like.

The domain 254 management may include set up, management (e.g. passwords), and the like.

In embodiments, private domain 254 registration may provide protection for the domain 254 address from spam and telemarketers by making the domain 254 contact information non-public and therefore inaccessible to others.

Domain 254 locking may prevent hacking of a domain 254 name, prevent unauthorized transfer of domain 254 name, and the like. This feature may provide security features to prevent any other user 140 from accessing the domain 254 name information.

Domain 254 forwarding may allow one domain 254 to point or redirect a domain 254 access to another domain 254 name. This feature may be useful when a user 140 may have a number of domain 254 names and would like anyone that accesses the number of domain 254 names to be directed to a certain domain 254 name.

The registration service may provide a service to optimize search engine visibility. This may make it more likely that a domain 254 name may appear near the top of a web search result list.

A user 140 may want to develop an electronic presence 223 in association with a domain name. However, the user 140 may not want to pay for a domain name or may want an aged domain name, such as and without limitation for improved positioning in a search engine result. Alternatively or additionally, the user 140 may desire that the domain name be automatically or interactively provided. In any case, the user 140 may subscribe or utilize to a domain name registrant that may have domains available for which the user 140 may use a sub-domain. This may allow the user 140 to have a domain name without having to be concerned with the administration of the domain name. The domain name registrant may be associated with a number of domain names from which the user 140 may select to use a sub-domain. Alternatively or additionally, a domain name suggestion facility 227 that is associated with the registrant may automatically select the domain and/or sub-domain for the user. The domain registrant may maintain the domain name for a substantial amount of time providing for an aged domain name. In this way, when the user 140 selects the aged domain 254, the user 140 may get the benefit of the domain/sub-domain aged combination that may get a favorable rating from a web search engine. In embodiments, one of the factors related to a high (i.e. desirable) web search engine ranking may be the age of the domain name. This high ranking may be a factor in the electronic presence's 223 getting a favorable position in search results that the search engine provides. For example and without limitation, a domain name that has existed for ten years may have a substantially better web search engine ranking than a one year-old domain 254. In other words, all other things being equal, the older domain 254 may have a relatively favorable position in the search results as compared with the younger domain 254.

In embodiments a domain name suggestion facility 227 may collect information from a user 140 or from information provided by the user 140 to the system 100 for the purposes of suggesting a domain name to the user 140. The domain name suggestion facility 227 may process the collected information and generate suggested domain names based on certain criteria derived from the user 140 information. For example and without limitation, the user 140 may desire an electronic presence 223 through which local public schools can raise funds for athletic programs. The domain name suggestion facility 227 may identify information input by the user 140 and suggest a name such as "supportlocalsports.org" or "fundsforlocalsports.org". After the user 140 may select of the suggested domain names, the domain name suggestion facility 227 may act as a registrant by communicating with a domain name registrar to acquire the domain name for the user. Alternatively or additionally, the domain name suggestion facility 227 may contact a registrant to request that the registrant obtain the domain name from a registrar.

The user 140 may be able to view the available domain names of a registrant via the domain name suggestion facility 227. The domain name suggestion facility 227 may be the registrant or may be associated with the registrant. The user 140 may want to find a domain name that may sound like it is associated with an electronic presence 223 that the user 140 is going to develop. In another embodiment, the facility 227 may select the domain name for the user 140 based on the user's answering of some questions. For example and without limitation, the facility 227 may ask questions that include is the name for an electronic presence 223, is the name just for email, business type, personal use type (e.g. family pictures), or the like. The facility 227 may then select an appropriate domain name. The facility 227 may present the user 140 with a number of domain names from which the user 140 may select.

For example and without limitation, a user 140 may use a sub-domain/domain name combination such as User-Name.AgedDomain.Com. The "UserName" sub-domain may be a name that is chosen by or for the user. For example and without limitation, the name may include or be associated (such as a rhyme, homonym, synonym, and so forth) with the user's name, business name, organization name, or the like. The domain name "OldDomain.com" may be one of the domains provided to the user 140 by the domain registrant. In any and all case, a web search engine may recognize "OldDomain.com" as an aged domain and, by association, may attribute a high search engine ranking to the sub-domain/domain name combination UserName.OldDomain.Com.

The domain name (e.g. OldDomain.com) may be used by more than one user 140. For example and without limitation, there may be a UserName.OldDomain.com, a Business.OldDomain.com, and so forth.

The domain name registrant (or an associate thereof) may register the sub-domain/domain name combination with various search engines. The domain name suggestion facility 227 may also provide the user 140 with other suggestions direct at improving search engine rankings. These suggestions may relate to electronic presence 223 design, content, function, and the like.

Continuing to refer to FIG. 2, an electronic user directory 228 service may be a collection of user, business, sponsor, or the like information in a searchable directory. The electronic user's directory 228 may be a private director, a public directory, or any other type of directory. The collection of users 140 may be from a group (e.g. professional), association, society, or the like. For example and without limitation, an association of town businesses may create an electronic users directory 228 from the registered uses of the association. The directory may include personal information, association to a business, association to another member of the association, association membership information (e.g. office held), or the like. The directory information for each user 140 may include keywords, tags, or the like that may permit aggregation of user 140 information. In embodiments, paying sponsors may also be in the directory 228 by paying a fee to the user directory 228. The paying sponsors may be shown similar to an advertisement in the directory 228. The paying sponsors may have key fields, tags, or the like to permit grouping of paying sponsors, businesses, users, or the like.

The user directory 228 may have a social networking capability that may allow users 140 to contact other users, businesses, sponsors, or the like. The contact may be messaging between users, messaging between groups of users 140 (e.g. electronic distribution), email between users, emailing between a group of users, posting messages in a common communication page, having a user 140 tag indicating communication desired (e.g. looking for a certain type of business), or the like. For example and without limitation, the user 140 may have a tag that may indicate that he or she is a certain type of attorney (e.g. estate) looking for appropriate work. Another user 140 may be able to search or aggregate tags to find an attorney that does estate work. The social networking may be for personal reasons, business reasons, or the like. For example and without limitation, the social networking may be for promotional reasons such as inviting people, businesses, or the like to view a personal page, a business page, a rating page, or the like.

The user directory 228 may have a number of views in which to interact with the users 140 of the directory 228. There may be a user 140 view, a business view, a combination user 140 and business view, or the like. In the combination view, the user 140 may be presented a view that shows the association of users 140 to users, users 140 to businesses, businesses to users, businesses to businesses, or the like. For example and without limitation, the business to business view may allow the user 140 to view how one business is a supplier for another business. A view may also show how different users 140 may be associated such as business partners, married, or the like.

The user directory 228 may have an aggregation capability. The aggregation may be performed on any of the fields within the directory 228 such as name, location, business, business type, association, leads group, business group, or the like. The aggregation of information may return related users 140 and businesses as part of the aggregation. For example and without limitation, the aggregation may be for estate attorneys and the returned result may be a listing of estate law firms but also a list of the attorneys within the law firm that do the estate planning. The aggregation may also be performed using the tags that may be associated with a particular user.

The user directory 228 may also have an associated public directory of users 140 that may have a more limited amount of information such as name, location, phone numbers, email addresses, or the like.

The information for the user directory 228 may come from electronic presences 223, email, text messages, hard copy, or the like.

An information searching 282 service may enable a user 140 to be able to search on information, meta-information, or any and all other content within or associated with any and all electronic presences 223, databases, domains, or the like. Information searching 282 may be associated with a user interface 124 to perform searches; the search area (e.g. electronic presences 223, domain, database, and so on) may be definable.

Information searching 282 may be implemented as an application that may search a client 102, database, file system, network, or the like for a particular file, topic, book, article, personal information, web page, database entry, and so on.

Information searching 282 may use network crawlers to collect information from the network; the information may be indexed, hashed, or the like to provide faster searching for information stored on the network. In embodiments there may be more than one index, hash, or the like for the collected information. A network crawler may be an application that is capable of following links from one location on the network to other locations on the network and providing the gathered information to the search application.

Information searching 282 may be provided as a service within or associated with an electronic presence 223. For example and without limitation, information searching 282 may be provided in an electronic presence 223 as a search field (in which a user 140 may enter a textual search string); a number of search fields; radio buttons or checkboxes that may enable, disable, or otherwise affect an aspect of the information searching 282; and so forth. In any case, information searching 282 may include an information search, message board search, people search, business search, book search, article search, blog search, academic search, real estate search, or search for any and all other desired information. In embodiments the information searching 282 may provide specialized search terms depending on the information required, interpret the search terms for meaning and perform the search, search for all the words in a user 140 search term, or the like. If an embodiment of information searching 282 does not understand the search terms, the information searching 282 may return no information; the information searching 282 may suggest other search terms to the user; and so on.

Information searching 282 may provide the user 140 with a listing of web sites, locations, files, images, video, or the like that match the users 140 requested search. The listing may contain links to the location of information that the user 140 requested. The listing may provide the user 140 with a brief description of the listings contents. The listing may be in order of best match ranking with the best match at the top of the list. The listing may list all possible matches.

The information searching 282 may provide a list of matching information that are from sponsored locations, paid advertiser locations, or the like.

A leads group 230 service may be a group of businesses, enterprises, individuals, or the like that may organize themselves to provide leads (business or personal) to members of the group by other members of the group. In embodiments, one feature of a leads group 230 may be that no two members of a particular leads group 230 represent the same type of business. For example and without limitation, the leads group 230 may have only one insurance business, one restaurant owner, one market owner, or the like as part of the leads group 230. The intent is for one member of the leads group 230 to provide business leads to other members of the group. For example and without limitation, the insurance business may hear of an organization looking for a caterer for an event, the insurance business may provide the catering lead to the restaurant owner that is part of the leads group 230. To improve the business networking of the leads group 230, the leads group 230 may look for other business types to join the leads group 230, invite a business that may already be in another leads group 230 to join their leads group 230, or the like. Leads groups 230 may use a service (leads group 230 service) to locate new leads group 230 members, aggregate electronic presences, search for potential members, provide leads or business listings, create invitations, schedule meetings, form new leads groups, and perform any other search, social networking, publishing, or other functions associated with leads groups.

A backup/archive facility 231 may enable a user 140 to backup/archive any and all of an electronic presence 223 to his or her local client 102, an external client 102, or the like, including web pages, interactive voice response architectures and audio, multimedia, file storage, and so forth.

A user groups 232 service may be an element of an electronic presence 223 that allows a collection of businesses, enterprises, individuals, or any and all such users 140, who have a common interest, to share information with each other and/or affiliate or associate with one another. A user 140 may officially associate himself with a user group 232 by declaring or requesting his membership in the group, such as and without limitation by checking a box on a web page, entering information in a textual field, communicating to a process for adding users 140 to the group 232, and so forth. A user 140 may be automatically associated with the group when he declares his membership. A user 140 may be manually or semi-automatically associated with the group when a member of the group receives his request and approves his request. Approval of the request may require approvals my members of the group 232. A user 140 may be able to instantiate a new user group 232 by declaring or requesting the existence of the group 232. The new user group 232 may be instantiated upon the user's 140 declaration. The new user group 232 may be instantiated after an administrator or super user receives the request for a new group 232 and approves the request.

For example and without limitation, a user group 232 may be a computer programmer user group 232. Users 140 associated with this group 232 (such as "members" who have officially associated themselves with the group 232 and who may partake in some or all of the features and functions of the group 232, "guests" who may partake in some or all of the features and functions of the group 232 but have not officially associated themselves with group, and so on) may be able to share programming tips, create a knowledge base for users 140 to look up answers to common problems, provide a forum for users 140 to post questions where members of the group 232 may provide answers to the questions, and the like. User groups 232 may include many different types of businesses that have a need to share common knowledge, common interest, or the like.

In embodiments, user groups 232 may enable a member or guest of the group 232 to locate new user group 232 members. The user group 232 may be used to search electronic presences 223 for business, enterprises, individuals, or the like to join a user group 232. The user group 232 service may be provided with the type of membership for which the particular user group 232 may be searching. For example and without limitation, the user group 232 service may search for any electronic presence 223 that may provide C++ programming services. The user group 232 service may search any and all electronic presences 223 to find keywords in the electronic presences 223 that may be associated with the electronic presences 223. The keywords may be found in the text of an electronic presence 223, in electronic presence 223 tags, in electronic presence 223 metatags, or in any and all other information that may be associated an electronic presence 223. In embodiments the search provided by the user group 232 may search and any and all electronic presences 223, may be associated with or utilize the information searching 282, or may access a third-party Internet search engine (such as and without limitation that of Google) to provide or augment search results of the user group 232, the information searching 282, and so forth.

The user group 232 may include a web crawler, spiders, or the like to find potential user group 232 members. The crawler may be given at least one electronic presence 223 and the crawler may follow links and associated pages to find additional electronic presences 223 to search for potential user group 232 members.

The user group 232 may automatically send an invitation to a potential new member, may provide a list of potential new members to the user group 232 for approval, may invite a user 140 to be a guest of the group 232, or the like. The invitation may be an email, a phone call, a pager message, an instant message, a cell phone message, or the like.

A user 140 may use a user group 232 to form a new user group 232. The user 140 may provide the user group 232 with his or her business type to start the search. The user group 232 may search any and all Internet websites to provide the user 140 with a list of potential members of the new user group 232. Additionally or alternatively, the user group 232 may search and any and all information associated with any and all electronic presences 223 to provide the user 140 with a list of potential members of the new user group 232. The user group 232 may automatically send an invitation to join the new user group 232, may provide a list of potential new user group 232 members to the user 140 for approval, or the like.

A user 140 may receive user group 232 suggestions from the electronic presence creation wizard 239, site improvement agent 243, or the like. As a user 140 is answering questions as part of a electronic presence creation wizard 239, the wizard may access a user group 232 (or information associated therewith) to provide the user 140 with a list of potential user groups 232 to join, suggest the forming a user group 232, or the like. As a site improvement agent 243 reviews an electronic presence 223, the agent may provide the user 140 with a list of potential user groups 232 to join, suggest the forming a user group 232, or the like.

A business rating 234 service may provide ratings of business, services to any and all users 140. The businesses may be a physical business such as a restaurant, a store, or the like or may be a network based business. The network business may provide items, services, or the like over a network. The ratings may be developed using a questionnaire that the business may answer, interviewing the business, an on-site visit to the business, feedback from customers of the business, or the like. The interview may be done by a phone interview, web interview, in person interview, or the like. The resulting rating may be any type of rating that would provide a consistent evaluation between similar businesses such as a number rating (e.g. 1-10), star rating, thumbs up/down rating, or the like. A user 140 viewing a business rating 234 may understand a certain rating is the equivalent to a certain level of quality, service, or the like.

There may be a number of different questionnaires that may be used to interview a business. The different questionnaires may be based on the type of business, the type of services provided by a business within a business category, or the like. For example and without limitation, a different questionnaire may be used to interview a restaurant than a bookstore. In another example, there may be different questionnaires for different types of bookstores such as a bookstore with just books verses a bookstore that also provides a cafe.

The business rating 234 service may search for a business to rate by a network search, reviewing business listing (e.g. electronic or hardcopy), user 140 request, or the like. The network search may use a search engine with search terms, a web crawler, or the like. The network search may look for key information within a business webpage, look for information on the webpage tag, or the like. A crawler may search a network using a file of key business information to look for. There may be more than one crawler looking for new businesses. In embodiments, once a network business is identified a questionnaire may be automatically sent, sent after review by the business rating 234 service, or the like.

The business search may be performed by the business rating 234 service reviewing a business listing. The business listing may be an electronic listing of businesses, a hardcopy of businesses (e.g. yellow pages or business to business listing), or the like. The business rating 234 service may review the business listing and select any business that should get a questionnaire. The questionnaire may be used in an in person or on-site interview with the business.

A user 140 may request that the business rating 234 service provide a rating on a certain business. The user 140 may request a rating by providing information such as a webpage, address, or the like of which the business the user 140 desires a rating. Based on the request for a rating, the business rating 234 service may develop ratings on other similar businesses. For example and without limitation, a user 140 may request a rating for an exotic pet store and the business rating 234 service may provide the requested exotic pet store with a questionnaire for a rating. Additionally, the business rating 234 service may search for other exotic pet stores that are in the same category and send them a questionnaire. The other exotic pet stores may be retrieved from a web search, a printed listing, or the like.

In embodiments, users 140 may be able to provide the business rating 234 service with ratings of the business. The users 140 may provide ratings for the business that already has a business rating 234 service rating, provide a rating for the business prior to the business rating 234 service, or the like. The user's rating may be available in addition to the business rating 234 service rating. For example and without limitation, the business rating 234 service may have a rating for a certain shoe store and users 140 may provide additional ratings of the shoe store that may reflect their personal experience with the shoe store. There may not be a limit to the number of user 140 ratings for a business. The user 140 that provides a business rating 234 may be any user 140 and may not have to be a subscriber of the business rating 234 service. The user 140 that provides a business rating 234 may be any user 140 that is a subscriber of the business rating 234 service. The user 140 may be able to provide a rating to the business and may additionally provide comments that may support the users 140 rating.

Any non-subscribing user 140 may be able to view the ratings of a business. The non-subscribing user 140 may be able to view the business rating 234 service rating, user 140 ratings, or the like. Any subscribing user 140 may be able to view the ratings of a business by the business rating 234 service, ratings by users, or the like and may additionally be able to drill down into the rating data of the business. A subscribing user 140 drilling down into the details of the business rating 234 may be able to view answers to the business rating 234 questionnaire, request additional information from the person responsible for the business rating 234 service rating, communicate with a user 140 that provided a user 140 rating, or the like. For example and without limitation, the non-subscribing user 140 may be able to see that a business has a certain rating such as 1-10 but the subscribing user 140 may be able to see the business rating 234 service rating, the user 140 ratings, any available comments, or the like.

The extent that the business completes the questionnaire may be reflected in the business rating 234 service rating. For example and without limitation, if the business only answers the minimum of questions about the business location, type of services or items offered, or the like, the rating may provide a rating based on the available information. If the information is incomplete or does not provide for a full rating, the business rating 234 service may be provide an indicator with the rating that the business did not provide enough information for a full rating. In this case, the business rating 234 service may also direct the user 140 to any of the user 140 provided business ratings 234 to supplement the information provided by the business.

Based on the completeness of the questionnaire, the business rating 234 service may allow the business web site to add a link to the business rating 234 service rating of the business. The better the response to the questionnaire, a more visually appealing rating link may be provided to the business. For example and without limitation, for a minimally completed questionnaire the business may just get a standard link to the rating. For a more complete questionnaire the business may be provided with a link with a graphic, banner, or the like that may provide an improved visual of the business rating 234 with the business rating 234 service. The graphic, banner, or the like may be in the form of an official business rating 234 service logo.

If a business returns a less complete questionnaire, the business rating 234 service may give the business additional chances to more fully complete the questionnaire by sending the incomplete questionnaire back to the business. The business rating 234 service may continue to return the questionnaire until the same numbers of questions are answered at least two times.

For a substantially completed questionnaire, the business rating 234 service may offer to provide a webpage to the business based on the answers to the questionnaire. The questionnaire may be or be associated with an electronic presence creation wizard 239 to provide an electronic presence 223 that is adapted based upon some or all of the completed portion of the questionnaire.

A resume processing facility 237 may be an application capable of reviewing a resume and capturing aspects of the resume for further use. The capturing of the aspects of the resume may include storing desired information into a database, a questionnaire, a form, a document, a spreadsheet, or the like. The captured aspects may be used for further analysis, data drill down, aggregation, employment decisions, or the like. The capturing process may include analyzing an electronic resume, scanning a hardcopy resume into an electronic format (e.g. OCR scanning), or the like. The aspect capturing may be personal information, business information, professional information, hobby information, and the like. The resume processing facility 237 may analyze content using any number of statistical, grammatical, rule-based, expert, or other systems, and on that basis may direct resumes to potentially interested employers or make recommendations to the author concerning improvements to the resume. In addition, the resume processing facility 237 may use the resume to supplement or revise the questionnaire.

The questionnaire may be used along with a site development wizard for the development of an electronic presence 223. As previously described, the site development wizard may create an electronic presence 223 or the like from the information within the questionnaire. The site development wizard may develop the webpage using just the questionnaire information from the resume, from resume information and additional information, interactively with the person as more information is added to the resume information, or the like.

The questionnaire may be used along with a site improvement agent 243 for the improvement of an electronic presence 223. As previously described, the site improvement agent 243 may improve an existing electronic presence 223 based on the information within the questionnaire. The site improvement agent 243 may improve the webpage using just the questionnaire information from the resume, from resume information and additional information, interactively with the person as more information is added to the resume information, or the like.

An electronic address book 229 may be similar to a standard paper address book that may allow a user 140 to keep address information. The address information may, without limitation, include name, address, phone number, email address, job title, company name, business type, fax numbers, mobile phone numbers, instant messenger address, work department, manager and staff information, nickname, spouse name, birthday information, anniversary date, online meeting information, a note, and the like. The electronic address book 229 may provide this information as an aspect of an electronic presence 223 and/or may provide this information to email applications, instant message applications, business contact applications, any and all of the services 261, and so forth. The electronic address book 229 may be able to export stored information to other applications that may include a spreadsheet application, a word processor, a mail label application, or the like.

The electronic address book 229 may allow the user 140 to organize the electronic address book 229 by at least one of the stored information fields. For example and without limitation, the user 140 may be able to sort the stored information by name (first or last), business, email address, street address, town, zip code, area code, or the like. The method of sorting the stored information may also be the method of display when viewing the information using another application. For example and without limitation, if the electronic address book 229 has the stored information sorted by last name, the electronic address book may be displayed in last name order in an email application.

The electronic address book 229 may allow the user 140 to create groups of address information. The groups may allow a user 140 to organize address information into common information types that may include organizations, businesses, occasions (e.g. Christmas card 209 addresses), or the like. For example and without limitation, the groups may be directed at allowing the user 140 to send an email to an entire group using a group name; the email may be sent to all the email addresses within the group.

The electronic address book 229 may allow a user 140 to search the stored information. Any of the fields within the stored information may be searched.

An electronic address book 229 may be able to synchronize with a portable client 102 to transmit address information. The portable client 102 may include a portable digital assistant (PDA), a laptop computer, a handheld computer, a smart phone, or the like. For example and without limitation, the address book may use Microsoft's Active Sync software, Apple's iSync software, or any such software to transfer address book information to the portable client 102. The electronic address book 229 may be able to import address information from a client 102. The electronic address book information may be shared over a computer network and may be accessed from any client 102 that is connected to the network.

The electronic address book 229 may be a web-based application that may allow the user 140 to access the stored information from any web capable device. The electronic address book 229 may allow the user 140 to share electronic address information with other users 140 over a network.

An electronic presence 223 creation wizard 239 may be a tool for the development of a webpage or minisite of an electronic presence 223 that may be used individually or as a collection of webpages or minisites of the electronic presence 223. The wizard may be used by a user 140 that may have little or no experience in creating a webpage, by a user 140 with some experience but would like a more professional electronic presence 223 look, by an experienced user 140 to rapidly create a webpage that may then be manually modified, or the like.

The electronic presence 223 creation wizard 239 may take the form of a questionnaire to be filled out by the user, present webpage design suggestions to the user 140 as the webpage is developed by the user, or the like. The wizard 239 may ask the user 140 questions about the webpage characteristics, questions based on previous questions, questions after a particular feature has been added to a webpage design, or the like. Based on the answers to the wizard's questions, searches may be performed by the wizard 239 to find relevant content, images, video, articles, quotes, links, or the like that may be applied to the webpage design. The search may be a search on the user's computer for relevant information, a web search for relevant information, a network search, or the like. The results of the search may be presented to the user 140 in a list, an object collection, a document, a database, a file, or the like where the user 140 may be able to select information that may be useful to the webpage content.

For example and without limitation, a user 140 may be creating a webpage for a shoe store. The wizard 239 may search the users 140 client 102, connected network client 102s, Internet, or the like for promotional information for shoe manufacturing companies. The wizard 239 may use an answer about the type of shoes sold to find particular shoe vendor information on the latest shoes, find statistics for the benefit of certain shoes, testimonials from athletes that may use certain types of shoes, or the like. The wizard 239 may store the search results to be combined with other information determined from the wizard's questions and display the webpage design all at once, may display the searched information as it is found, or the like. The wizard 239 may determine what information in the returned search results that may be the most relevant information for display on the webpage, the wizard 239 may present all the results to the user 140 for selection in the webpage, or the like.

Another example may be a plumber electronic presence 223 where the wizard 239 may find a number of links to plumbing supply sources to be incorporated into the webpage. Depending on the type of plumbing, the information provided may be for construction plumbing with city water and sewer piping, indoor plumbing materials such as sinks, tubs, copper pipe, or the like.

Based on answers to the wizard's questions, the wizard 239 may make suggestions of the proper promotion possibilities for the webpage. For example and without limitation, the wizard 239 may suggest that a link to the users 140 webpage be placed on a webpage for a related society, association, group, organization, or the like. For example and without limitation, for a webpage of a local conservation group the wizard 239 may suggest a link on the Audubon Society electronic presence 223 that may generate more traffic on the local conservation group webpage. The wizard 239 may contact the Audubon Society electronic presence 223 to request a link to the local conservation group webpage.

In another example, the wizard 239 may submit the webpage URL to the various search engines that may allow the webpage to appear on the search engines. The wizard 239 may suggest a webpage design that may result in a high (i.e. desirable) search engine page rank for the webpage such as the text content of the webpage, the images displayed, the webpage title, the number and type of links, and the like. The wizard 239 may develop a webpage containing metatags that may provide a high search engine page rank by including words or phrases that may properly classify the webpage within the various search engines. The wizard 239 may include metatags to include the webpage in at least one search category of a search engine.

The wizard 239 may present the user 140 a questionnaire that may consist of at least one section. At least one section may contain mandatory information gathering questions such as the user 140 name, URL, business name, administrator name, requested email addresses, type of business, country, state, city, zip code, area code, region, and the like. There may be a predetermined number of information sections, an open-ended number of sections, or the like. The predetermined number of sections may be determined by the business type, region, state, city, or the like. For example and without limitation, a business for greeting cards 209 may have five sections where a business for a veterinarian may have ten sections. Each section may have related questions such as desired text content, any business images required, links desired, or the like.

All of the sections may be presented to the user, some of the sections may be presented, or the like. Some of the questionnaire sections may be skipped based on previous answers in other sections. For example and without limitation, a user 140 may answer a question that video is not desired and therefore the video section may be skipped and not presented to the user.

The wizard 239 may not display the webpage until all of the sections have been presented to the user. Once the user 140 has completed the questionnaire, the webpage may be displayed to the user. In embodiments, once the webpage has been displayed to the user, the user 140 may be able to manually change the webpage design, change the webpage design by changing answers in the questionnaire, or the like.

Any time during the answering of the questionnaire, the user 140 may display the webpage; the webpage may be displayed using the questions that have already been answered by the user. After the user 140 has displayed the webpage, the user 140 may be able to reopen the questionnaire and continue to answer questions on the questionnaire. The user 140 may be able to move between the webpage design and the questionnaire as the user 140 desires. This may provide a method of viewing intermediate webpage designs as certain questions are answered. If the user 140 reopens the questionnaire, the user 140 may be able to return to a previously answered section to change an answer to view how the webpage appearance may be changed. For example and without limitation, a user 140 may view the webpage design that is based on the user 140 provided answers, return to the questionnaire to change a certain answer and return to the webpage design view to see the difference the revised question made to the webpage design. For example and without limitation, a veterinarian may revise a question on the type of animals treated to indicate that exotic pets are treated. This may result in the wizard creating a webpage that may provide more information on parrot and lizard care and treatment.

The webpage may be created and displayed as the user 140 answers the questionnaire. In this manner, the user 140 may be able to view the webpage as it is created with each answer, this may permit the user 140 to easily change the design of the webpage interactively. The questionnaire may be presented in a window where the user 140 may answer questions while also viewing the creation of the webpage as it is developed.

Figure 10:
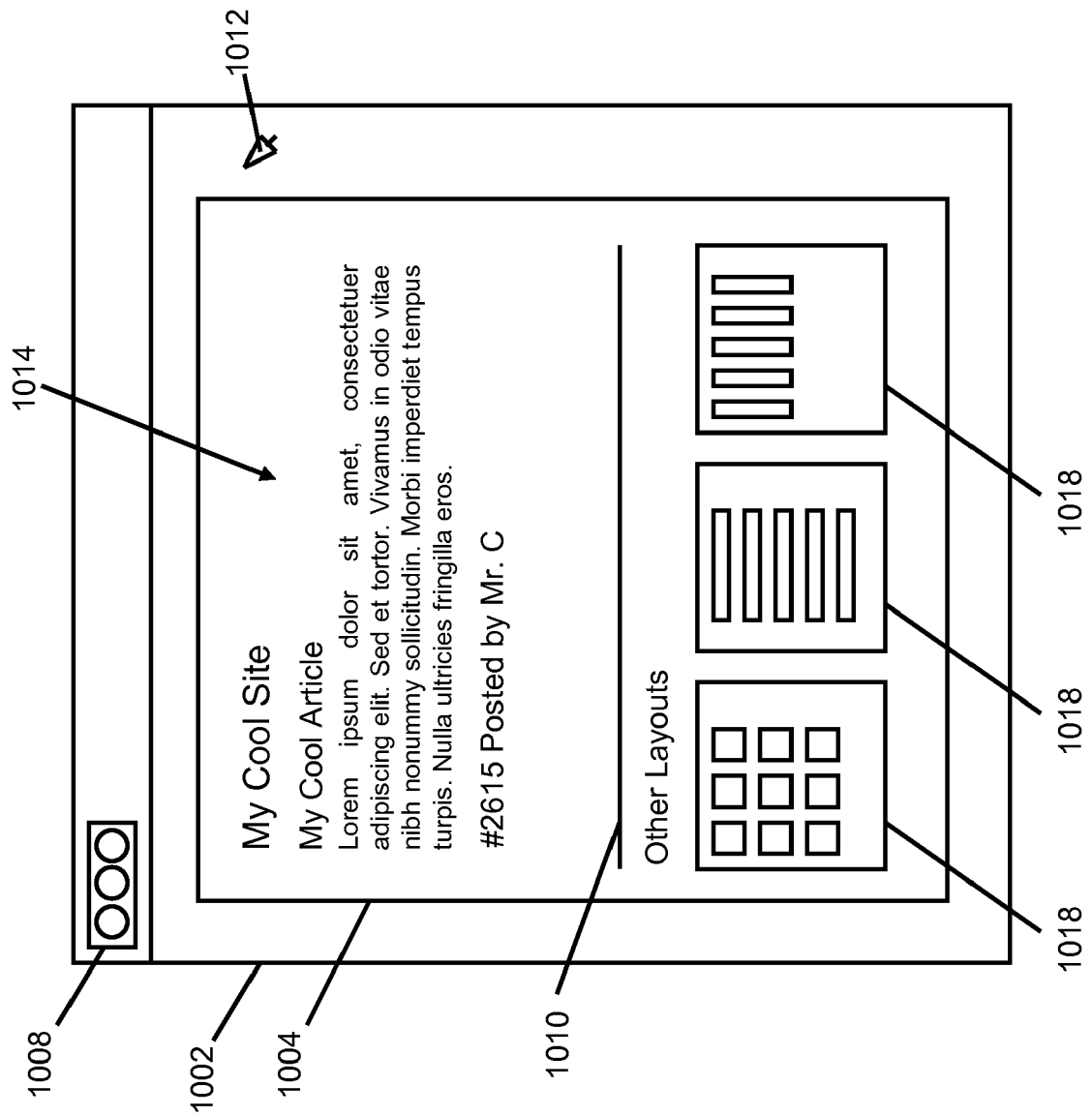
FIG. 10 depicts a user interface for modifying a minisite.

Referring to FIG. 10, in embodiments, during the webpage development or during subsequent modifications to the webpage, the user 140 may be able to interact with the webpage as a simulation or a real demonstration of the webpage operation. The example illustrated here involves a webpage containing a blog, but it will be appreciated that the interfaces, interactions methods, concepts, systems, methods, and other aspects of the present system apply equally to any and all webpages, minisites, and so on. Here a web browser window 1002 contains a frame 1004 and window control icons 1008 (for reducing, expanding, eliminating, or otherwise modifying the size or presence of the window 1002). Within the frame 1004, a view 1014 of a blog, presented according to a webpage layout, is shown above a horizontal line 1010. Alternate webpage layouts may be presented in the form of thumbnails or miniature representations 1018, which appear below the horizontal like 1010. A cursor 1012 also appears hovering over the window 1002. A user 140 may alter the appearance of the view 1014 by a selection process in which the user 140 drags the cursor 1012 over a thumbnail or miniature representation 1018, thus indicating his selection. Perhaps without a mouse-click action, the window 1002 may render the view 1014 according to the alternate layout of the thumbnail or miniature representation 1018. This may provide the user 140 with a preview of what the webpage would look like, were the user 140 to perform a mouse-click or other action to activate the alternate layout 1018. In any case, the view 1014 and the alternate layouts 1018 may be produced from a website or minisite template, which may be described herein and elsewhere.

Figure 11:
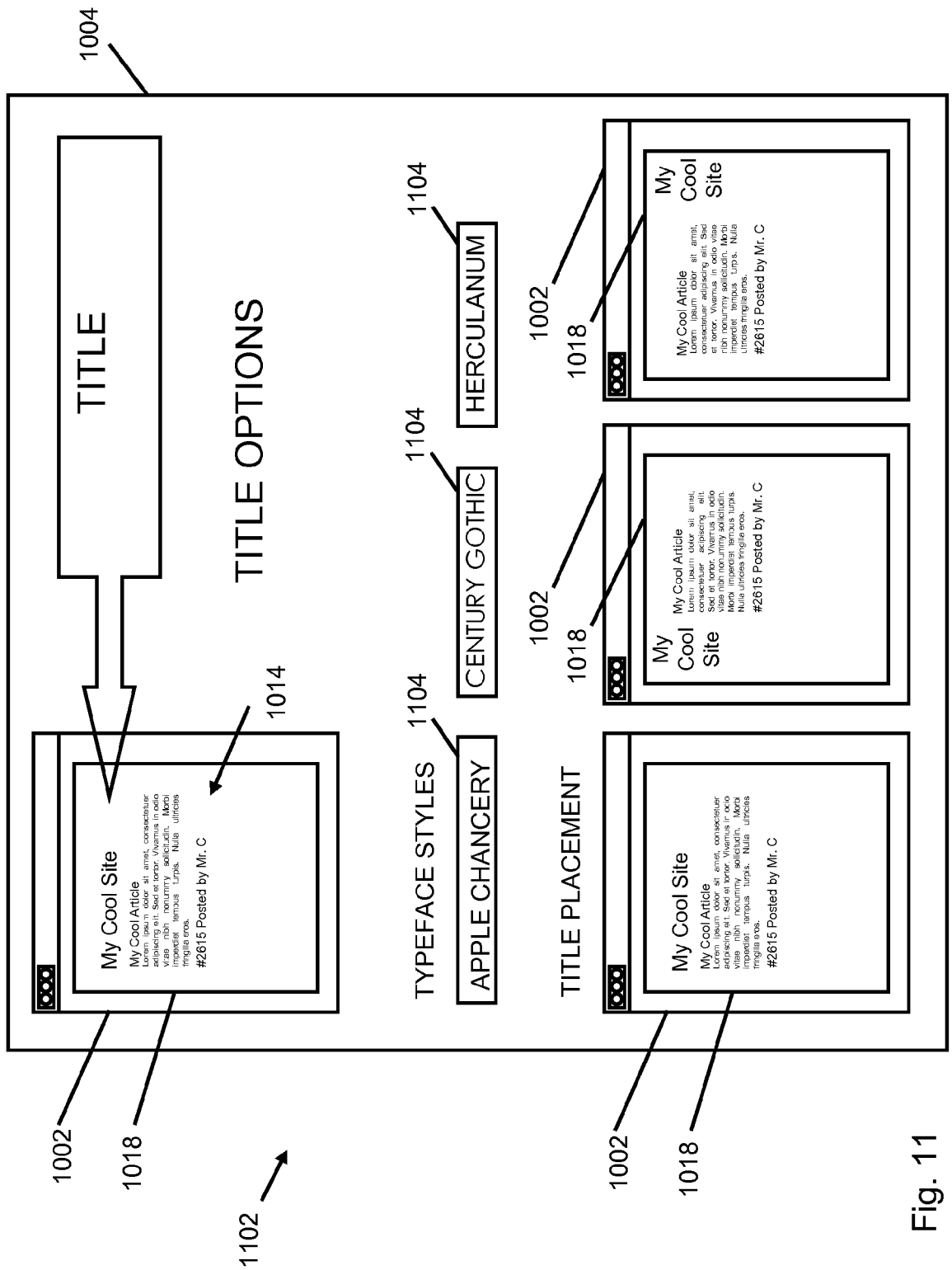
FIG. 11 depicts a fold-out view for modifying a minisite.

Referring now to FIG. 11, when a user 140 drags the cursor 1012 over an element in the view 1014, a fold-out view 1102 may appear in the frame 1004. In the present depiction, provided for the purpose of illustration and not limitation, the element is a title. It will be appreciated that any and all elements of the view 1014 may receive an analogous treatment in the fold-out view 1102, when such the user 140 drags the cursor 1012 over such elements in the view 1014. Continuing on, this fold-out view 1102 may include a consumer-level technical representation of the website or minisite of the view 1014. As shown, the fold-out view 1102 may additionally or alternatively display a thumbnail or miniature representation 1018 of the view 1014 and/or the window 1002 (of the website or minisite) as it currently exists. In the fold-out view 1102, the element over which the cursor 1012 was positioned (in this example, a title) may be highlighted (such as, in this example, by a box and arrow that is labeled "TITLE"). A number of options relating to the highlighted element may be provided. For example and without limitation, as depicted, the frame 1004 may contain three choices of typeface 1104 for the title and three choices of placement 1108 of the title. As depicted, these choices 1104, 1108 may appear as miniature representations 1018 of a view 1014 and/or window 1002. Perhaps according to the selection process described hereinabove with reference to FIG. 10, the user may select a typeface or a title placement. The miniature representation 1018 of the view 1014 may automatically provide a preview, in miniature, of what the webpage would look like, were the user 140 to activate the selection.

Figure 12:
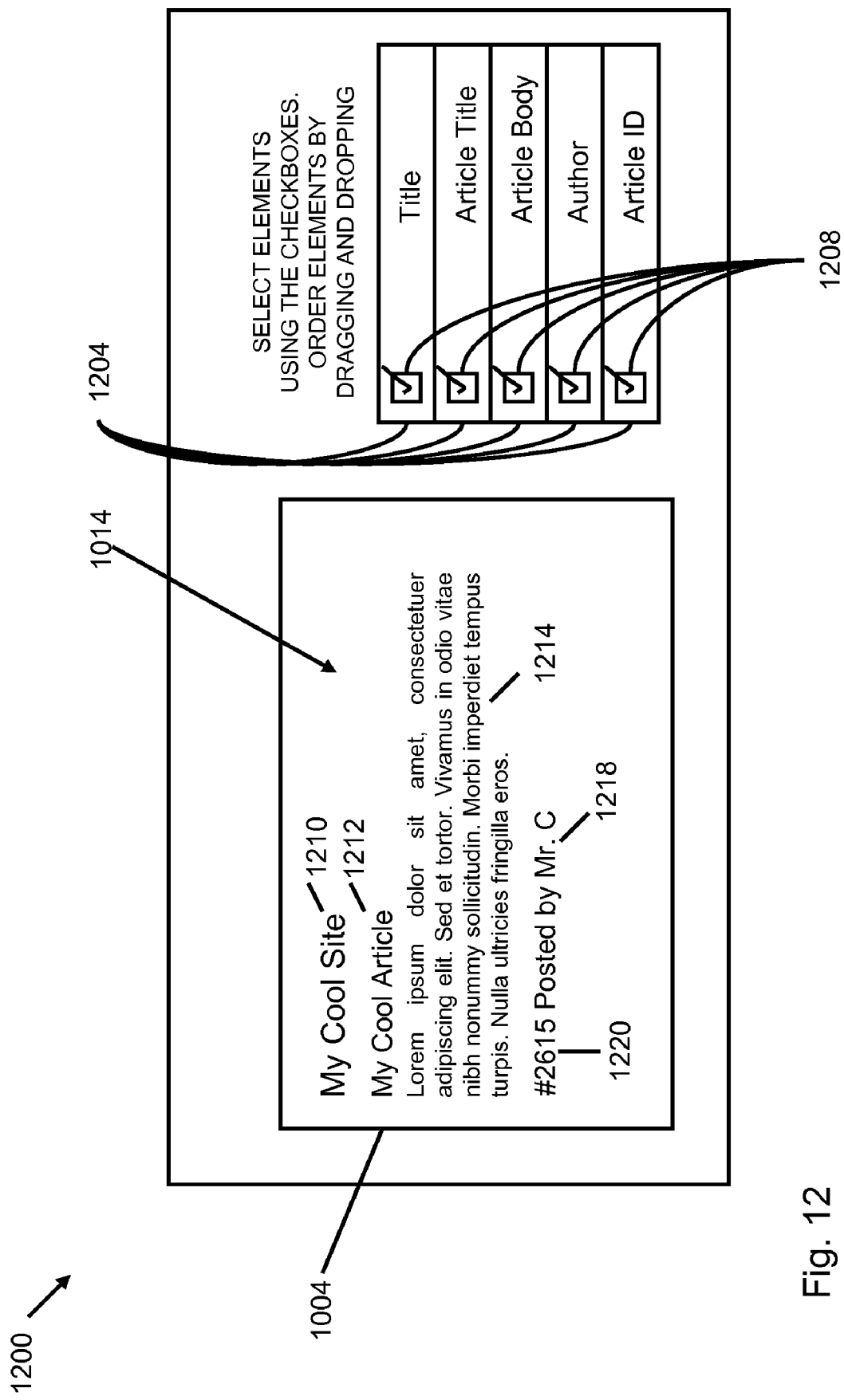
FIG. 12 depicts a user interface for toggling and organizing elements of a minisite.

Referring now to FIG. 12, a user interface 1200 for toggling and/or organizing elements of a website and/or minisite. The present illustration pertains to blog minisite with a particular set of elements (title 1210, article title 1212, article body 1214, author 1218, and article ID 1220). However, it will be appreciated that the systems and methods of the present system are not in any way limited to a blog minisite or this particular set of elements. The user interface may be provided in a window 1002, a frame 1004, and so forth. The user interface 1200 may include a frame 1004 containing a view 1014 of a blog minisite. The user interface 1200 may also include a selection frame 1202 in which a number of selection items 1204 appear. Each selection item 1204 may contain the name of one of the elements (1210, 1212, 1214, 1218, 1220) of the minisite, along with a toggle field 1208. Thus, each selection item 1204 may associate an element with a toggle field 1208 and provide a visual representation of that association. The user 140 may toggle the value of a toggle field 1208, such as by activating or deactivating the field 1208 via a mouse click or key press. As the user 140 does this, the view 1014 may adapt by removing an element when its associated toggle field 1208 is deactivated and by inserting the element when its associated toggle field 1208 is activated. The user interface 1200 may allow the user 140 to drag and drop a selection item 1204 with respect to the other selection items 1204. Such dragging and dropping may serve to reorder the selection items 1204, as one item 1204 may be dragged above or below another item 1204 and then dropped there. When a user 140 does this dragging and dropping, the view 1014 may adapt by reordering the elements 1210, 1212, 1214, 1218, 1220 to correspond to the ordering of the selection items 1204. For example and without limitation, the user 140 may drag and drop the "title" selection item 1204 so that it appears both below the "article title" selection item 1204 and above the other selection items 1204. Perhaps in response to this, the view 1014 may change to show the title 1210 below the article title 1212 and above the other elements 1214, 1218, and 1220. Many other such examples will be appreciated with respect to blogs, minisites, websites, webpages, services, electronic presences, and so on. All such examples are within the scope of the present system.

Referring again to FIG. 2, in embodiments, information and/or content associated with an electronic presence 223 may be exported to preserve the HTML content. An electronic presence 223 may include HTML text, images, static links, dynamic links, text, premium text, and the like. The purpose of the HTML export may be to store the structure, objects, content, design, and any and all other aspects of the of the electronic presence 223 using an export facility 241 to an alternate storage location. The HTML export facility 241 may export static aspects of the electronic presence 223 that may include the HTML text, non-linked images (e.g. static), static links, content text, and the like. Any and all dynamically linked objects, premium objects, or the like included in the electronic presence 223 design may not be exported as part of the HTML backup. For example and without limitation, an electronic presence 223 may contain dynamically linked weather information. This information may require a programmatic, proprietary, or any and all other such automatic features that may not be readily provided in the HTML export. Alternatively or additionally, perhaps for technical or business reasons, the automatic features may not be provided outside of a web host from which the electronic presence 223 is being exported. In any case, the dynamically linked weather may not be stored with the exported information. As another example, premium content such as a paid article, which may be owned by a third party, may not be exported by the export facility 241.

The HTML electronic presence 223 information may be exported by using an export facility 241 that may be associated with the creation of the site, subscribed to as an export service, or the like. The export facility 241 may export the HTML information automatically, at the users 140 request, at an administrators request, at a web masters request, or the like. The electronic presence 223 information may be exported to the service, an alternate location associated with the service, a network location accessible by the service, or the like.

The export may be performed automatically at a time period set by the user 140. The time period may be the same period each time, the user 140 may indicate a time period range (e.g. 1 pm-4 pm) to perform the export, or the like. The export service may perform the export without the user 140 knowing when the export is performed. The user 140 may be able to view an export log to view past exports, the next predicted export, or the like. The user 140 may be able to set a configuration to indicate the objects of the electronic presence 223 to export to the alternate location.

The export may be user 140 initiated with the user 140 selecting a menu option, clicking a button, or the like. The export facility 241 may only be visible to a user 140 that logs in with a certain identification. For example and without limitation, there may be a button that is only visible with certain login information. Clicking the button may start the export sequence. The user 140 may answer export information for export backup, may preset a configuration for the objects to be exported, or the like. For example and without limitation, the user 140 may preset the objects on the electronic presence 223 to be exported. By clicking the button, the export facility 241 may read the export configuration and perform the export without any additional user 140 interaction. This method may constitute a one click export method for electronic presence 223 HTML exports.

Enterprises may provide network storage space 242 for users 140 to upload and store files. The storage space 242 enterprise may require a user 140 to log in to provide security of the files stored on the network storage system. This may include a range of conventional services such as storage quotas, folder hierarchies, synchronization, downloading, uploading, file metadata, and the like.

A site improvement agent 243 may be used to review an electronic presence 223 to determine if modifications may be made to improve an aspect of the same. A user 140 may provide an electronic presence 223 URL to the agent 243 for the site improvement agent 243 to perform an electronic presence 223 review. The agent 243 may review the electronic presence 223 at a user 140 defined frequency, a random frequency, a set time period, as certain visit metrics are met, or the like. The certain visit metrics may be the number of site visits, reference visits from other electronic presences 223, visits based on a search engine, or the like. After the agent 243 has reviewed the electronic presence 223, the user 140 may be provided with a set of changes that may improve the electronic presence 223 performance. The user 140 may be notified by email, instant message, phone message, cell phone message, pager message, fax, or the like. The improvements may be improved ratings with search engines, electronic presence 223 visual appearance, electronic presence 223 popularity, the fresh look of the site, or the like. The agent 243 may also suggest or make changes to other electronic presence 223 features such as links on the electronic presence 223, links on other electronic presences 223, the information in the metadata tags, or the like.

The rating with a search engine may be influenced by the text content of the electronic presence 223, the titles used in the electronic presence 223, the image type and images used on the electronic presence 223, video used on the electronic presence 223, and the like. The agent 243 may track the electronic presence's 223 position in the search engine results by periodically performing a standard search and determining the position of the electronic presence 223 on the search results. The agent 243 may suggest changes to the electronic presence 223 content to improve the ranking from the initial position the electronic presence 223 receives, suggest changes when the search result changes, or the like. The changes may include adding keywords, changing keywords, increasing the number keywords, or the like. The agent 243 may suggest changes to the user. If the changes are made the agent 243 may perform a set of search engine search test to determine if the changes yielded an improved search engine rating. Further changes may be suggested to the user 140 based on the electronic presence 223 change and the search engine test.

The agent 243 may suggest changes to the appearance of the electronic presence 223 for site colors, title, title look (e.g. font, size, location), image locations, text locations, or the like. The agent 243 may use standard electronic presence 223 design practices, a set of electronic presence 223 design templates, or the like to make changes to the appearance of the electronic presence 223. The agent 243 may compare the present electronic presence 223 design to a template for determination if changes should be made to make the electronic presence 223 look more like a selected template. The template may be selected from a set of stored templates (such as and without limitation those that may be stored in the template database 512), which may be available to the agent 243. The agent 243 may design an alternate electronic presence 223 design that incorporates the suggested appearance changes for the user 140 to view. The user 140 may view the alternate design and choose some design changes, choose all design changes, or the like. After the user 140 has approved the changes that he or she desires, the agent 243 may make the appropriate changes to the electronic presence 223, replace the electronic presence 223 design with the alternate electronic presence 223 design, or the like.

The agent 243 may be able to measure a popularity of the electronic presence 233 by tracking metrics of site visits. The site visit metrics may be measured against previous site visit metrics, measured against other similar electronic presence 223 metrics, or the like. The agent 243 may periodically view the site visit metrics to determine if other users 140 are visiting more or less frequently than a previous time period. The agent 243 may provide suggestions to improve user 140 visits by suggesting a change to the electronic presence 223 visual appearance, changing the products available on the electronic presence 223, changing the links on the page, changing the links on other electronic presences 223, adding links on other electronic presences 223, changing the metadata tags of the electronic presence 223 to improve search engine rating, or the like. After changes have been made to the electronic presence 223 that are directed to improve the electronic presence 223 popularity, the agent 243 may measure the electronic presence's 223 visit metrics at an increased frequency to determine if the changes were successful.

The agent 243 may measure the visual freshness of the electronic presence 223. The visual freshness may be related to how long an electronic presence 223 has had a certain visual design. Customers may be drawn to an electronic presence 223 that changes it's look from time to time to keep the customers coming back to see what is new. The agent 243 may periodically view an electronic presence 223 to determine if the electronic presence 223 layout has changed within a certain time period. If the agent 243 determines that the electronic presence 223 design has become static, the agent 243 may suggest changes to the electronic presence 223 to make it look new to customers. The content of the electronic presence 223 may not be changed from a previous version of the electronic presence 223, but the suggested electronic presence 223 changes may include color changes, rearranging the content of the site (e.g. text or images), changing titles, or the like. After the electronic presence 223 has been revised to improve the fresh look of the electronic presence 223, the agent 243 may measure the electronic presence's 223 visit metrics at an increased frequency to determine if the changes were successful.

The agent 243 may be able to determine the effectiveness of existing links on an electronic presence 223. The agent 243 may track the number of times a certain link has been used to access a different electronic presence 223. The agent 243 may suggest removing links, adding links, changing link locations on the electronic presence 223, or the like. After the electronic presence 223 has been revised the links of the electronic presence 223, the agent 243 may measure the electronic presence's 223 visit metrics at an increased frequency to determine if the changes were successful (e.g. search engine rating).

The agent 243 may be able to determine the number of times the electronic presence 223 has received a visit based on a link from another electronic presence 223. The agent 243 may compare the number of electronic presence 223 references from other electronic presence 223 links to determine the most effective referencing links. The agent 243 may suggest removing a link from another webpage, adding a link to another webpage, or the like. After the electronic presence 223 has revised the links of other electronic presences 223, the agent 243 may measure the electronic presence's 223 visit metrics at an increased frequency to determine if the changes were successful by measuring metrics such as search engine rating, site visits from other electronic presence 223 links, and the like.

The agent 243 may suggest changes to the metadata tags of the electronic presence 223 in order to increase the search engine rating. The agent 243 may be able to measure the metadata tags that similar electronic presences 223 are using and the effectiveness of the metadata tags in improving search engine ratings. The agent 243 may review the metadata tags used by other electronic presences 223 and compare them to the metadata tags used on the users 140 electronic presence 223. The agent 243 may suggest changes based on the review of the other electronic presence 223 metadata tags. After the electronic presence 223 has revised the metadata tags of the electronic presence 223, the agent 243 may measure the electronic presence's 223 visit metrics at an increased frequency to determine if the changes were successful by measuring metrics such as search engine rating, site visits metrics, and the like.

An electronic presence 223 may provide a business service 244. The business service 244 may include banking, loans, stock information, stock purchase, starting a business, publishing, online sales, ecommerce, mutual funds, market searching/researching, or the like.

The business service 244 may categorize the services provided by the web business. The business service 244 may provide links to established banks, brokers, publishing houses, marketing firms, or the like to provide services. The business service 244 may provide advice columns on financial topics, bill paying services, online banking, e-commerce services, and so forth.

The business service 244 may provide the ability to track stock markets, track individual stocks, track a type of stock, buy stocks, or the like. The stocks may be from a standard stock market (e.g. NYSE).

The business service 244 may provide a market research capability where the user 140 may be able to contact a market research enterprise and request market information.

Continuing to refer to FIG. 2, in embodiments, personal advertisements 248 may be provided as a service 261 where a user 140 may provide personal information into a searchable database (such as and without limitation the content database 510). In embodiments, users 140 may search the personal advertisements 248 using parameters describing the type of person they would like to meet. The search may return personal data that may match the search criteria. The returned personal data may include text, images, video, or the like. The personal information may include sex, gender, sexual orientation, age, location, activities, photos, personality, body type, languages, children, education, profession, religion, income, interest, or the like. A collection of personal information that is associated with a user 140 may be referred to as a "personal profile." The personal profile may relate to an archetypal person that the user 140 would like to meet. The user 140 may be able to access the personal advertisements 248 from any client 102 capable of connecting to the network. A user 140 may create a personal profile that may be used to search for matching personal profiles. When a match is found, the user 140 may be presented with a personal advertisement 248 that is associated with the match.

After a user 140 selects a matching personal advertisement 248, the user 140 may contact the match by email, by instant messenger, in person, or the like. A personal advertisements 248 electronic presence 223 may provide an instant messenger chat area for people to have a conversation, perhaps without revealing their true identities, locations, or other sensitive information.

In some embodiments, users 140 may tag a personal advertisement 248 with metadata tags, which may be viewed and/or searched by users. The personal advertisement 248 include the tags, which may assist in the processing of personal advertisements 248 for the benefit of a user, such as to automatically find a personal advertisement 248 that is relevant to the user; to generate a histogram or statistic related to the frequency of ads, relationships between ads, and so on; and so forth.

A sponsored listing 252 may be provided as a service 261 that enables businesses, enterprises, or the like to place sponsored advertisements within an electronic presence 223, such as and without limitation within a webpage, minisite, electronic mail system, instant messaging system, weblog, text messaging system, and so forth. The sponsored listing 252 may be placed on a search result page, an electronic presence 223, or the like. The sponsored listings 252 may be relevant to the search results, webpage displayed, electronic presence 223 displayed, or the like. For example and without limitation, a user 140 may use a web search engine to find information on swimming pools. The service providing the search engine may use sponsor listings 252 to place advertisements of swimming pool builders, swimming pool devices, swimming pool supplies, or the like on the search result page. The sponsored listing 252 may be a link, a link embedded within an object (e.g. image), a banner, a pop-up window, or the like.

An accessibility feature 253 may make an electronic presence 223 may be made more accessible to people requiring enhanced viewing characteristics. The site may provide indications of sound to a deaf person, audio clues to a blind person, large font for a visually impaired person, or the like.

A user's ID may have an associated tag that may indicate the type of enhanced viewing characteristics that the site may read and automatically adjust the view of the site. For example and without limitation, the users 140 tag may indicate the user 140 is deaf and as the user 140 enters the site, the site may automatically apply the accessibility feature 253 for the deaf user.

An accessibility feature 253 for the deaf may include providing closed captioning for any sounds within the site, video stream a visual gestured language (e.g. American Sign Language) for audio portions of the site, or the like. For example and without limitation, as a deaf user 140 moves the mouse over an object that would broadcast a sound, the electronic presence 223 may provide a closed caption for the sound.

An accessibility feature 253 for the blind may include providing audio voice over for visual objects, an audio stream for a visual object, or the like. A blind person may be able to move the mouse around the electronic presence 223 and as the mouse rolls over an object, the object declares itself as an audio stream. For example and without limitation, as the mouse is rolled over an OK button, the button may provide the audio clue "OK button". The audio clue may provide additional information such as what the result of clicking the "OK" button may be, such as "Click OK to accept the download".

Accessibility feature 253 for the visually impaired may include providing increased font size, a magnifier, or the like that may be capable of making the text of the electronic presence 223 more readable. The user 140 may be able to select the font size in which to view the electronic presence 223. For example and without limitation, some people may be able to read the site using an 18-point font but others may require a 24-point font. The user 140 may also be able to choose a different font. The user 140 may find Arial easier to read instead of New Times Roman and therefore may be able to change the font of the electronic presence 223. In another embodiment, the user 140 may be presented with a text magnifier that the user 140 may be able to move around the electronic presence 223 and may magnify the text that is under the magnifier. The user 140 may have control over the size and magnification of the magnifier.

The tag associated with the user 140 ID may also contain the information to determine the preferred accessibility feature 253 such as increased font, font size, speaker level, preferred sign language (e.g. American, French), or the like.

Each of the electronic presences 223 may be associated with organization types 259. The organization types 259 may include an individual, a consumer, a sole proprietor, a business organization, a non-profit organization, a governmental organization, or any other type of organization. Without limitation, the organization type 259 may include of the business types referred to in U.S. Provisional Patent Application No. 60/825,111, filed on Sep. 8, 2006 and entitled "Electronic Presence Systems and Methods". The entire content of this provisional application is incorporated by reference herein. The business types may be represented in templates, business rules, or any other information useful for designing an electronic presence, or for guiding a wizard or other automated creation process in the design thereof.

A web design 260 service 261 may interact with a user 140 to aid in the design of an electronic presence 223. An electronic presence 223 may include a website or minisite, which may be a collection of associated web pages. The web design 260 service may be web based, network based, application based, individual client 102 based, or the like. The client 102 may include a desktop computer, laptop computer, server, web server, handheld computer, smart phone, personal digital assistant (PDA), or the like.

The web design 260 service may include a user-commanded design service, a user-interactive design service, an automatic design service, or the like. Any and all of these web design 260 service may include a WYSIWYG feature. Moreover, these web design 260 services may provide a graphical or textual user interface 124 for accepting user 140 input that is directed at designing a web page. This user interface 124 may include a web page, a form, a text message, an instant message, or any other user interface.

The user-commanded design service may provide web design 260 tools for a user 140 to fully create a webpage design without design guidance from the web design 260 application. The user 140 may be fully responsible for the creation of the webpage by providing images, background, text, color selection, icons, links, and the like.

The user-interactive design service may automatically generate or select a design of a web page based on a user's answers to questions; semi-automatically generate or select a design of a webpage based on actions of the user 140 that are directed at designing a webpage, or the like. The actions of the user 140 may be received from a user interface 124 that is provided to the user 140 by the web design 260 application for this purpose.

The fully automatic web design 260 service may ask the user 140 questions relating to design aspects of the webpage and provide a design to the user. For example and without limitation, the web design 260 service may ask the user 140 about the basic design, background, color scheme, images, text, icons, links, and the like. Additionally or alternatively, the web design 260 service may utilize any and all information that is available to or generated by any and all elements of the present system, including, without limitation, information that may be gathered by the electronic presence creation wizard 239, the site improvement agent 243, the resume processing facility 237, the accessibility facility 253, and so forth. The fully automatic web design 260 service may create at least one webpage design and present to the user 140, for review, at least one webpage according to the design. Subsequently, the user 140 may be able to make manual changes to the webpage in a user-commanded fashion, make modifications to the webpage in a user-interactive fashion, or make refinements interactively in a fully automatic fashion, or the like.

After the design of the webpage is complete, the web design 260 service may provide tools, methods, or the like to associate the webpage with a domain 254 name.

The web design 260 application may be associated with a service that may allow the creation and/or selection of the domain 254 name, association of the web pages with the domain 254 name, maintenance of another webpage, or the like. Many services for the creation and/or selection of the domain 254 name are described herein and elsewhere, while still others will be appreciated. All such services relating to the domain 254 name are within the scope of the present system.

Horoscopes 262 may be implemented as a service 261 that may a provide user's horoscope 262 description. A user 140 may tag the horoscope 262 description with metadata tags, which may be viewed and/or searched by users 140. The horoscope 262 service 261 may utilize the tags for the purposes of processing horoscope 262 descriptions for the benefit of a user, such as to automatically find a horoscope 262 description that is relevant to the user; to generate a histogram, biorhythm, or statistic related to the frequency of horoscope 262 descriptions, relationships between horoscope 262 descriptions, and so on; and so forth.

Still referring to FIG. 2, electronic mail (email 264)—which may be a service 261—may allow a user 140 to send an electronic communication to another user 140 via or in association with the electronic presence 223. The email 264 communication may consist of text, documents, images, animation, video, or the like. If the communication is received and/or transmitted by an embodiment of the present system, the communication may be stored in any and all of the databases described herein and elsewhere, for example and without limitation the content database 510. The email 264 may be created using the email 264 service 261, which may provide features that may include a text creation window, folders for storing email 264, printing, reply, forward, send/receive, font control, attachments, address book, mail account maintenance, and the like.

A user 140 may input text into an email 264 application text editor for the creation of an email 264 message. The email 264 may contain a destination address. The email 264 may be addressed to at least one destination address, which may be associated with a user 140, a group of users 140, a service 261, an electronic presence 223, and so on.

The email 264 application may be implemented as a standalone application on a users 140 client 102, a web application (e.g. Hotmail), or the like. The email 264 address may be associated with a domain 254 name. For example and without limitation, if the domain 254 name is "MyDomain.com", an address for this domain 254 may be "john@MyDomain.com". A domain 254 may have a number of associated email 264 addresses. When an email 264 is received at a domain 254, the domain 254 mailbox may store the email 264 until an email 264 client (e.g. Thunderbird) connects with the domain 254 mailbox to receive the stored email 264; then the stored email 264 may be downloaded to the email 264 client. For example and without limitation, the email 264 may utilize the POP3 protocol and may be under the control of the user.

Email 264 that are web based may be accessible to the user 140 from any network connected device. Web based email 264 applications may store the email 264 on a web server associated with the web email 264 application.

Maps 268 may be implemented as a service 261 to provide a user 140 with various types of maps 268 of an area. The maps 268 may be accessible over a network. The user 140 may be able to view, download, zoom, pan, or the like the map on a client 102 that may include a desktop computer, laptop computer, PDA, handheld computer, cell phone, smart phone, or the like. The map 268 may include road maps 268, topographical maps 268, satellite maps 268, and the like. The maps 268 may include extra details such as restaurants, lodging locations, banks, shopping malls, golf courses, gas stations, schools, and the like. The user 140 may be able to control the display of the extra details on the map. The maps 268 may support map-based functions such as route determination, trip time, driving distance, address searching, points of interest identification, and so forth.

Still referring to FIG. 2, in embodiments, an instant messenger 270 may be a service 261 that allows a user 140 to communicate electronically with at least one other user. This communication may be instantaneous, in real time, time delayed, or the like. The method of communication might include utilizing a desktop computer, laptop computer, server, web server, handheld computer, smart phone, personal digital assistant (PDA), or the like.

The user 140 may share text, images, files, or the like with at least one other user. The user 140 may communicate using the instant messenger 270 application through a network.

The user 140 might input text using a keyboard, a touch screen, a speech recognition program, or the like.

The text shared may include direct entry, documents, notes, webpages, or the like. The images may, without limitation, include photos accessed directly from a digital imaging device, documents scanned into the messaging system, digitized information from other sources, information from a computer storage device, or the like. The files may include groups of documents, notes, digitized images, or the like.

The user 140 may input text into the messenger 270 and press the 'enter' key, click a send button, or perform another action to indicate to instruct the messenger 270 application to transmit the text. Alternatively or additionally, the messenger 270 application may transmit the text as it is entered by the user. The text may be transmitted through the network to at least one other user's address. At least one other user 140 may access the text and can reply electronically. The messenger 270 may enable a user 140 to save the text, reply electronically later, ignore the text, delete the text, or the like.

The user 140 may invite more than one other user 140 to enter an instant messaging screen, session, or area that may allow more than one user 140 to instant message at the same time. In embodiments, only those users 140 invited to enter this area may be allowed to access the instant messaging of the users 140. Alternatively or additionally, only invited users 140 may be able to submit instant messages to this area, while invited users 140 and other users 140 may be able to receive instant messages in this area.

The user 140 may define a list of other users, expressed as a set of instant messaging addresses. These users 140 may be known to the user 140 and my include friends, colleagues, associates, and the like. The user 140 may add to, delete, or otherwise modify this list of instant messaging addresses. The user 140 may accept messages from addresses on this list of instant messaging addresses. The user 140 may deny access from other addresses. The messenger 270 may be configured (such as and without limitation by a user 140) to electronically block messages from particular users 140 or groups of users 140. The user 140 may define some addresses as unacceptable, inappropriate, or the like and may deny access either permanently or until the user 140 chooses to accept the access. The user 140 may search for other known users 140 through various search methods. These search methods may include searching for a screen name, a given name, an email address, a physical address, or the like.

The user 140 may create a list of messages that may be displayed when the user's instant messaging address is accessed. The user 140 may choose to indicate availability to receive or send instant messages using a predetermined message that may appear when another user 140 attempts to access the user. This list may include notification of non-availability. The user 140 may choose to hide his availability or to appear invisible to receive messages from other users. In embodiments the user 140 may monitor attempts to access the user's instant messenger 270 address while maintaining the user's invisibility. The user 140 may receive notification of attempts to access the user's instant messaging address. In embodiments, other users 140 may be able to leave a message if the user 140 is not available or not accepting messages.

The instant messenger 270 may also include or be associated with an electronic address book 229. This list of addresses may include email address, instant message screen name, physical address, telephone number(s), important information such as birthdays, anniversaries, other pertinent information, or the like. This list may be synchronized with address programs, which may be Web-based. This access might be through a network, exchanging memory, direct connection to another device, or the like.

A mobile application 272 may be a service 261 that is adapted for the particular input and output capabilities of mobile devices (for example and without limitation, relatively small screens, relatively limited keypads, and so on). The mobile device may be a phone, smart phone, PDA, handheld computer, or the like.

The mobile application 272 may be an adaptation of another service or an alternate version of another service 261. For example and without limitation, the mobile application 272 may include an instant messenger 270 service, an email 264 service, a blog service 204, an image gallery 210 service, a video 284 service, an information searching 282 service, an address book 229 service, a maps 268 service, and so on. Alternatively or additionally, the mobile application 272 may be associated an element that is related to a mobile client 102, such as and without limitation an input signal 104, a help signal 108, a communication between a client 102 and an information resource 118, a web browser, a Wi-Fi locator, a compass, a GPS locator, and so on.

The mobile client 102 may include a mobile application 272 for sending and receiving messages with any other type of client 102 or server that may be connected to the Internet such as a messenger 170, an electronic mail service 264, a blog service 204, an image gallery service 210, a web browser, and the like. The mobile client 102 may view an electronic presence 223 that is adapted, perhaps by a mobile application 272, for a display of the mobile client 102. The mobile client 102 may communicate with the Internet by a cell network, Wi-Fi (e.g. 802.11(x)), Wi-Max, IR, wire connection, or the like. Other mobile applications 272 may be associated with maps 268, driving directions, restaurant information, news, movie information, and the like. Any and all mobile applications 272 may be associated with a communication between a mobile client 102 and an information resource 118.

News 274 may be provided as a service 261 that delivers, to a user 140, information on a number of subjects that may include headlines, top stories, sports, local news, world news, U.S. news, politics, business, science, technology, health, entertainment, travel, opinions, or the like. A news 274 web page may provide links to additional news 274 electronic presences 223 such as AP, Reuters, AFP, USAToday.com, NPR, CNN.com, and the like. The links may vary for the different news 274 subjects. For example and without limitation, a technology news 274 may include computer publication (e.g. PC World) based links while sports news 274 may have sporting publication based links (e.g. The Sporting News). A news 274 service may allow a user 140 to personalize the news 274 he receives from the service 261 such as, and without limitation, by adding his own news 274 links, adding a news 274 section, removing a news 274 section, or the like. The personalization of a news 274 service may require the user 140 to sign into the news 274 service.

Note sharing 278 or note keeping (such as and without limitation notes) may be provided as a service 261 to allow a user 140 to create notes (e.g. text) that may be accessed from any network connected client 102. A client 102 that may include a desktop computer, laptop computer, PDA, handheld computer, cell phone, smart phone, or the like. The notes 278 service may be provided to a user 140 in the form of a text editor, which may be web-based. Images, graphics, or the like may be created, modified, deleted, saved, or the like in association with the notes 278. In embodiments, other documents or files may be attached to the notes 278. The notes 278 may be associated with drawing capabilities that are directed at creating and/or including graphic objects in the notes 278. The individual notes 278 may be stored in a notes 278 folder, electronic presence 223, and so on. There may be more than one notes 278 folders; the notes 278 folders may be organized as a folder structure using a tree format; and so on. The user 140 may add folders, delete folders, rename folders, or the like.

The notes 278 service 261 may be associated with and/or enable the searching of the folder structure, electronic presence 223, and so on for notes 278. For example and without limitation, a user 140 may be looking for a particular note 278 but may not remember where the note 278 is logically and/or physically stored. The user 140 may provide search terms to the notes 278 service (or to an associated search service, which, without limitation, a web search engine may provide) to locate the note 278. The note 278 may be searched using terms that may include file name, file type, file date, file comments, or the like. The user 140 may enter the search terms into a text entry field on a client 102, which in turn communicates the search terms to an information resource 118, which may process the search terms in accordance with the notes 278 service 261.

Continuing to refer to FIG. 2, in embodiments, online audio 280 may be associated with an electronic presence 223 that may provide podcasts, radio-like communications, music collections, or the like. The podcast may be an audio recording that may be posted online and may be downloaded by the user 140 for later listening. A radio-like communication may be an online broadcast of an over-the-air radio station; a streaming or downloadable digital audio transmission that is provided by the electronic presence 223; a streaming or downloadable digital audio transmission provided by a user, or the like. For example and without limitation, a radio station may wish to transmit their over-the-air broadcast shows nationwide. The radio station may broadcast to the local area over the airwaves but may communicate to the entire country by transmitting digital audio through an electronic presence 223 or from another such Web resource. In this manner, a user 140 may be able to listen to his favorite radio broadcast anywhere there is an Internet connection. Generally, the online audio 280 may be associated with a radio broadcast or a broadcast. Indeed, the online audio 280 may be delivered in a one-to-one fashion (unicast), a one-to-many fashion (multicast or broadcast), a many-to-many fashion (multicast or broadcast with many senders and many receivers), and so on. The online audio 280 may, without limitation, contain a song, an audio clip, an advertisement, a spoken story, a spoken news story, a background sound, a tone, a ringtone, an instructional message, a help message, an alert 114 message, a warning message, and so on.

In embodiments, online audio 280 services may categorize broadcast types that may present a user 140 with a number of online audio 280 choices that may be a similar genre. For example and without limitation, the audio may be categorized by Rock, Country, Classics, or the like. The online audio 280 may be a free service, a fee-based service, or the like. The online audio 280 may be provided by individuals on a periodic basis. Users 140 may be able to receive or transmit audio through an online audio 280 electronic presence 223. The online audio 280 service may provide a search facility to locate other online audio 280 resources that are not listed on within an electronic presence 223. The user 140 may be able to personalize the online audio 280, type of audio, groups of audio, or the like. The user 140 may be required to sign in to an electronic presence 223 that is associated with the online audio 280 (such as and without limitation an audio website) in order to personalize the online audio 280 electronic presence 223.

Online video 284 may be provided through or otherwise supported by an electronic presence 223. Online video 284 may provide video to be viewed online and/or to be downloaded and viewed later. The video may include movie trailers, previews of TV shows, outtakes of existing movies or shows, or the like. Full-length video may be provided by online video 284 services (e.g. iTunes) of previously broadcast shows. For example and without limitation, episodes from "Lost" may be downloaded for a fee after the show has broadcast on TV. Online video 284 may be provided as a video feed, clip, segment, file or the like, which may be provided on demand. For example and without limitation, the online video 284 may be associated with a video broadcast, simulcast, rebroadcast, mashup, or the like of sporting events to an electronic presence 223. Online video 284 may be a collection of user-provided videos. Such videos may be provided to the user 140 as a result of a search. A user 140 may enter search terms to find video of a requested topic (e.g. Google Video). Online video 284 may be a live feed presented on or in association with an electronic presence 223 (such as and without limitation a website or other Web resource). The source of the online video 284 may be a webcam. For example and without limitation, nature electronic presences 223 may provide a webcam view of a natural habitat of an endangered species. Another example is the live web broadcast of a town meeting. Many other such examples will be appreciated and all such examples are within the scope of the present system.

An online video 284 service 261 may contain a collection of similar video such as sports, nature, health, science, news, or the like that may be provided by an individual, an organization, an enterprise, or the like on or in association with an electronic presence 223.

In embodiments, online video 284 may be provided as part of a news electronic presence 223, the online video 284 may be similar to video that may be broadcast on a news show, unique to a news electronic presence 223, provided by a user, related to breaking news, or the like.

The online video 284 may be viewed using an online viewer facility (such as and without limitation a video player plug-in for a web browser); downloaded and viewed using a user's video software (e.g. Windows Media Player); viewed online with the user's video software; or the like.

A weather 288 service 261 may provide weather-related information which may be incorporated into a web page or other component of an electronic presence as described herein. The user 140 may be able to access the network weather 288 using a client 102. The weather 288 information may be provided for a town, state, part of a country, a country, or the like. The user 140 may enter a location for which the weather 288 information is desired. For example and without limitation, the user 140 may request the weather 288 information for New York City. The user 140 may be presented with weather 288 information such as the daily forecast, week forecast, weekend forecast, extended forecast, hourly forecast, or the like. The user 140 may be able to choose different weather 288 maps to view the weather 288 for the location requested that may include radar, visible satellite, moisture vapor satellite, IR, or the like. In embodiments the weather 288 maps may be viewed independently or may be viewed in combination. The weather 288 maps may be view as static maps, dynamic map loops, or the like. The related weather 288 information may be provided for the weather 288 location that may include insect information, pollen information, travel information, outdoor cooking information, severe weather 288 information, airport information, or the like. The weather 288 may support a variety of outputs such as electronic mail updates or alerts 114 to a mobile device. The mobile device may include a PDA, handheld computer, cell phone, smart phone, or the like.

Electronic presence hosting 290 may be a service 261 provided by an online enterprise (e.g. Yahoo! and Google) that may allow a user 140 to develop an electronic presence 223 including web content, services such as those described above, and interactive systems ranging over a variety of communication channels. The electronic presence hosting 290 enterprise may provide a full range of tools for creating an electronic presence 223, associating the electronic presence 223 to a domain 254, providing visibility to web search engines, conducting e-commerce, registering a domain 254 name, communicating e-mail, and the like.

The electronic presence hosting 290 enterprise may provide expert tools to aid an inexperienced user 140 through the process of producing a web page and publishing the web page on the Internet such as providing ready to use images, clip art, text types, examples, standard backgrounds, layout templates, or the like. The user 140 may create a webpage using a personal webpage builder (e.g. FrontPage) and upload the webpage to the electronic presence hosting 290 enterprise. Alternatively or additionally, the personal webpage builder may itself be Web-based. The electronic presence hosting 290 enterprise may provide webpage management that allows a user 140 to create passwords, get information on site visits and visit information, add additional features (e.g. maps 268) to the electronic presence 223, or the like. The electronic presence hosting 290 enterprise may provide the user 140 with access to web ecommerce, secure payment systems, shopping carts and checkout pages, fraud protection, product organization, merchandise tools, web site performance reporting, support, and the like, all of which may be incorporated into a web page or other component of an electronic presence as described herein.

Mobile media 298 messaging, which may be incorporated into an electronic presence using the techniques described herein, may include a short message service (SMS) that allows users 140 to send mobile media 298 messages between mobile devices. The user 140 may provide text using the key pad of a phone, the key pad of a PDA, keyboard, touch screen of a phone or PDA, a microphone that is operatively coupled to a speech-to-text facility, or the like. The mobile media may be sent to an individual user, a group of users, or the like. When a user 140 receives a message, the mobile device may provide a notification that a message has been received to allow or to prompt viewing.

A mobile media 298 service 261 may support a text and/or multimedia message that is sent to a mobile media 298 center, which may in turn attempt to deliver the message to a command interpreter through any suitable communication channel. The mobile media 298 message may be delivered using a best-effort technique that does not guarantee delivery, or using a service-level agreement or guaranteed quality-of-service. The mobile media 298 messages communicate phone ring tones, wallpaper, maps, phonebooks, directions, weather, stock quotes, translations, zip codes, area codes, currency conversions, sports information, and the like. A user 140 may receive services and items by entering a text request and sending the message to a certain number. Mobile media 298 messages may be received for messages such as news alerts, financial information, sports information, and the like. Mobile media 298 messages may be used to make payments at a vending machine by sending a message to a vending machine. The message may charge the purchase to an account such as a credit card account, a phone number billing account, a debit card account, an account with the vending company, or any other account suitable for financial transactions. The message may indicate items for sale, items on sale, new items, times the items are on sale, or the like.

The mobile media 298 message may include abbreviations for common words to make inputting text easier. For example and without limitation, the word "for" may be replaced by "4", spaces may be removed with new words starting with capitalized letters, and the like. In an effort to make inputting text easier, the mobile media 298 message application may have predictive text that may attempt to determine the word being entered as it is entered.

Figure 13:
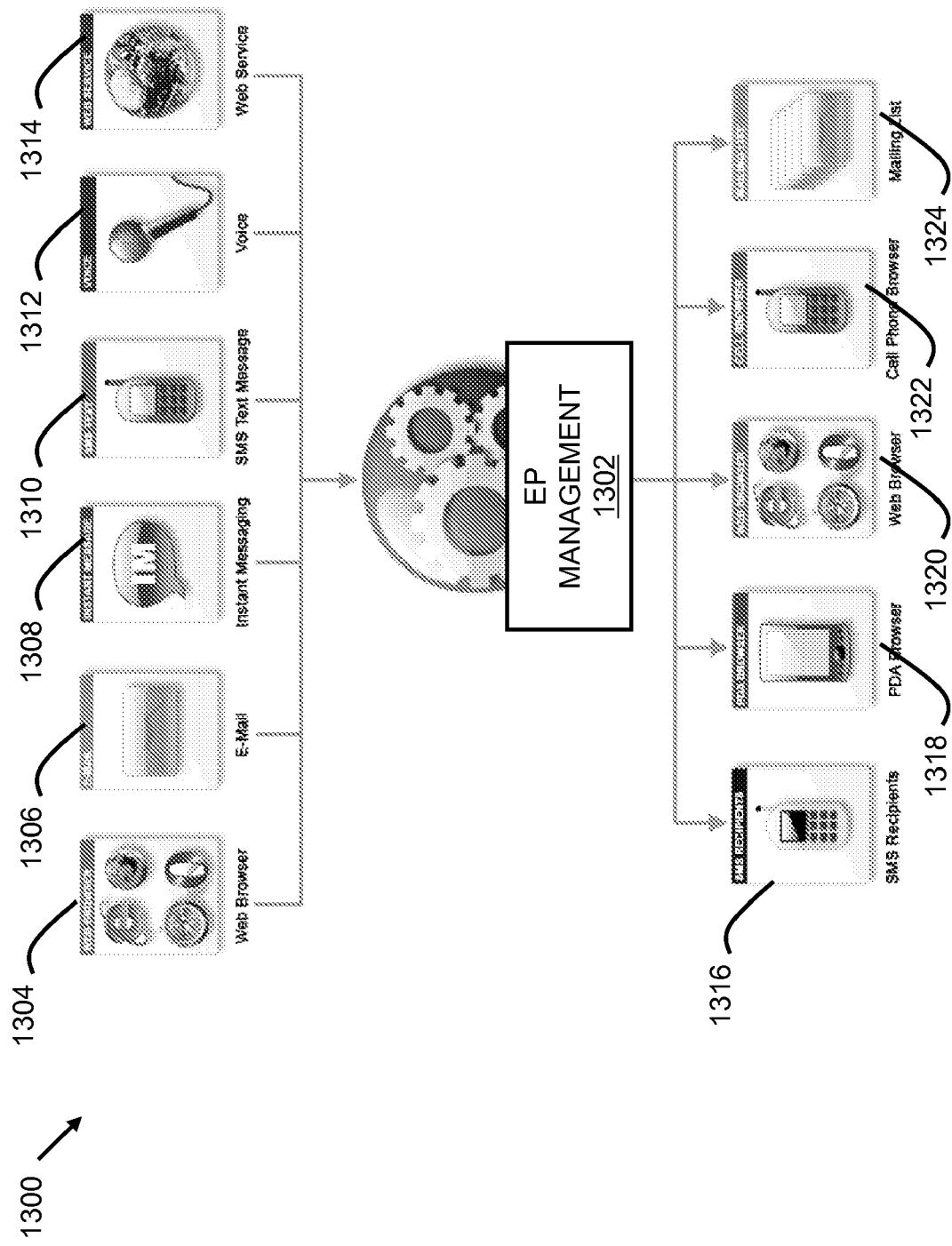
FIG. 13 depicts a high-level view of communication channels for electronic presence management.

FIG. 13 provides a high-level view of interactions supported by the systems and methods described herein. As depicted, an electronic presence management system 1302 may include an interface for receiving input from a variety of communication mediums such as a web browser 1304 communicating through an HTTP interface, an electronic mail system 1306, an instant messaging system 1308, a text messaging system 1310 such as an SMS system, a voice system 1312 such as a telephonic system, and a web service 1314. On the other hand, the electronic presence management system 1302 may control the output that forms an electronic presence 1300 through a number of communications mediums such as a text messaging system 1316 that reaches SMS recipients, a WAP/WML or other system that reaches a PDA browser 1318 connected to a local area or wide area network, a web browser 1320, a cellular phone browser 1322 on a cellular-based data network, an electronic mail system 1324 with one or more electronic mail distribution lists, and so forth.

The inputs and outputs may include without limitation a social bookmark site, an eBook library, an "about me" page, a file download site, a message board, a frequently-asked questions page, a page of links to web pages, a password page, a brochure page, a contacts page, an age verification service, a sitemap, a user agreement, an employee directory, a weblog, a calendar, an electronic mail, a mapping service, a directory, an image gallery, a weather service, a news service, and so forth. Thus it will be appreciated that the electronic presence management system 1302 may control input from and output to resources spanning numerous media types, communications protocols, communications infrastructures, computing resources, and the like.

In general, the electronic presence management system 1302 provides an interface to each of the input sources, which may be aggregated in a message queue or the like for internal processing. Messages within such a message queue may be parsed to identify commands for updating the electronic presence as generally described above. This includes, for example any number of commands to manipulate an electronic presence including commands to undo changes, forward communications to distribution lists, execute a stored collection of commands, change permissions, create new changes, update content, and so forth. These changes may in general affect a template for an electronic presence, thus changing a format, layout, structure, hierarchy, output types, or the like for an electronic presence, or these changes may affect content of an electronic presence, such as by adding or removing a weblog post, video, still image, page title, and so forth for which rendering is controlled by the template.

While many examples of inputs, outputs, and uses of an electronic presence management system 1302 are described above, some specific examples of actions that may be managed by posting to a message queue (or other internal representation of messages or commands) are now provided. Using the system 1300 described herein, a user may send an electronic mail that causes a file to be posted to, removed from, or replaced in a download library. An electronic mail may similarly be used to cause a story to be posted to, removed from, or replaced in a news page, or to cause an image and biography to be posted to, removed from, or replaced in a company directory. Sending an electronic mail may cause a link to be posted to, removed from, or replaced in a social bookmark site, or may cause an entry to be posted to, removed from, or replaced in a frequently-asked questions page. Sending an electronic mail may cause an entry to be posted to, removed from, or replaced in a calendar. Sending an electronic mail may cause a set of electronic mails to be sent to a group of users. Still more generally, a single electronic mail may cause multiple actions, either by embedding multiple commands or by invoking a portion of the template that has multiple outputs associated therewith. So for example a single electronic mail concerning an error in a website may cause a page to be removed from a website and a group of information technology specialists to be contacted. Similarly, text messages or http posts to a web page or other http-compatible network resource may be employed to perform numerous functions including those described above as well as any other suitable operation related to an electronic presence. Other inputs such as telephonic or cellular phone messages or interactive voice response inputs may be employed to issue commands to the electronic presence management system 1302.

By encapsulating an electronic presence in a template as described above, numerous input channels may be provided with a single point of contact for an electronic presence that has numerous output channels. The message queue and command processor may operate as logically separate or integrated components of this system that serve to transform received messages into modifications in the content and/or form of an electronic presence as described herein.

While the system has been disclosed in connection with the preferred embodiments shown and described in detail, various modifications and improvements thereon will become readily apparent to those skilled in the art. Accordingly, the spirit and scope of the present system is not to be limited by the foregoing examples, but is to be understood in the broadest sense allowable by law.

The invention claimed is:

1. A method comprising:
  receiving a command to update a web page of an electronic presence at a command processor executing on a hardware server, the command embedded in a message selected from a group consisting of an electronic mail message, an instant message, and a cellular text message;
  parsing the message at the command processor to identify the command; executing the command to update the web page;
  executing the command to update a non-web-based service of the electronic presence, wherein the non-web-based service is selected from a group consisting of an SMS (Short Message Service)-based service and a voice-based service;
  receiving a second command to update the web page of the electronic presence at the command processor, the second command embedded in a second message from a different one of the group consisting of an electronic mail message, an instant message, and a cellular text message;
  parsing the second message to identify the second command; and
  executing the second command to update the web page, wherein
  executing the command to update the non-web-based service comprises:
    generating a resource action;
    communicating the resource action to an information resource that provides the non-web-based service;
    receiving an alert from the information resource;
    interpreting the alert to determine an additional command;
    generating the additional command; and
    executing the additional command.

2. The method of claim 1 wherein the message is the cellular text message.

3. The method of claim 1 wherein the command undoes a most recent change.

4. The method of claim 1 wherein the command identifies a blog post by number.

5. The method of claim 1 wherein the command identifies a previous command by sequential number relative to the current command.

6. The method of claim 1, wherein the command includes an ambiguous command, the method further comprising:
  determining a disambiguated command from the ambiguous command, wherein executing the command includes executing the disambiguated command.

7. The method of claim 6, wherein determining the disambiguated command includes determining the disambiguated command from the ambiguous command in light of the second command.

8. A computer program product embodied on in a non-transitory computer readable storage medium, the computer program product comprising computer executable code that, when executing on one or more computing devices, performs steps of:
  receiving a command to update a web page of an electronic presence, the command embedded in a message selected from a group consisting of an electronic mail message, an instant message, and a cellular text message;
  parsing the message to identify the command;
  executing the command to update the web page;
  executing the command to update a non-web-based service of the electronic presence, wherein the non-web-based service is selected from a group consisting of an SMS (Short Message Service)-based service and a voice-based service;
  receiving a second command to update the web page of the electronic presence, the second command embedded in a second message from a different one of the group consisting of an electronic mail message, an instant message, and a cellular text message;
  parsing the second message to identify the second command; and
  executing the second command to update the web page, wherein
  executing the command to update the non-web-based service comprises:
    generating a resource action.

communicating the resource action to an information resource that provides the non-web-based service;

receiving an alert from the information resource;

interpreting the alert to determine an additional command;

generating the additional command; and executing the additional command.

9. The computer program product of claim 8 wherein the command undoes a most recent change.

10. The computer program product of claim 8 wherein the command identifies a blog post by number.

11. The computer program product of claim 8 wherein the command identifies a previous command by sequential number relative to the current command.

12. The method of claim 8, wherein executing the additional command causes an update to the web page.

13. The method of claim 12, wherein executing the additional command also causes an update to the non-web-based service.

14. The computer program product of claim 8, wherein the command includes an ambiguous command, further comprising:

computer executable code that, when executing on one or more computing devices, performs step of determining a disambiguated command from the ambiguous command, wherein executing the command includes executing the disambiguated command.

15. The computer program product of claim 14, wherein determining the disambiguated command includes determining the disambiguated command from the ambiguous command in light of the second command.

* * * * *